United States Patent [19]
Hosotani

[11] Patent Number: 6,061,252
[45] Date of Patent: May 9, 2000

[54] SWITCHING POWER SUPPLY DEVICE

[75] Inventor: Tatsuya Hosotani, Muko, Japan

[73] Assignee: Murata Manufacturing Co., Ltd., Japan

[21] Appl. No.: 09/211,342

[22] Filed: Dec. 15, 1998

[30] Foreign Application Priority Data

Dec. 22, 1997 [JP] Japan .................................... 9-352696

[51] Int. Cl.[7] ........................ H02M 3/335; H02M 3/315; H02M 3/24; H02M 7/538
[52] U.S. Cl. ................................ 363/16; 363/27; 363/97; 363/134
[58] Field of Search ................................ 363/16, 24, 25, 363/97, 95, 131, 134, 15

[56] References Cited

U.S. PATENT DOCUMENTS

| | | | |
|---|---|---|---|
| 4,336,587 | 6/1982 | Boettcher, Jr. et al. | 363/134 |
| 4,441,146 | 4/1984 | Vinciarelli | 363/20 |
| 4,809,148 | 2/1989 | Barn | 363/20 |
| 5,325,283 | 6/1994 | Farrington et al. | 363/21 |
| 5,570,278 | 10/1996 | Cross | 363/20 |
| 5,684,678 | 11/1997 | Barrett | 363/17 |
| 5,946,206 | 8/1999 | Shimizu | 363/65 |

FOREIGN PATENT DOCUMENTS

| | | | |
|---|---|---|---|
| 63-100993 | 6/1988 | Japan | H02M 3/28 |
| 5-191072 | 7/1993 | Japan | H02M 3/28 |

*Primary Examiner*—Peter S. Wong
*Assistant Examiner*—Bao Q. Vu
*Attorney, Agent, or Firm*—Ostrolenk, Faber, Gerb & Soffen, LLP

[57] ABSTRACT

A switching power supply device has a configuration in which a series combination of a first switching circuit and an input power source is connected in series with a series combination of a primary winding of a transformer and an inductor, a series combination of a second switching circuit and a capacitor is connected in parallel to the series combination of the primary winding of the transformer and the inductor, and the secondary winding of the transformer is provided with a rectifying smoothing circuit including a rectifying element. The first switching circuit is made up of a parallel connection circuit including a first switching element, a first diode, and a first capacitor. The second switching circuit is made up of a parallel connection circuit including a second switching element, a second diode, and a second capacitor. A switching controlling circuit is provided adapted to turn the first and second switching elements on and off alternately, with a period of time when both switching elements are off is interposed, and a capacitor is connected in parallel to the rectifying diode in the rectifying smoothing circuit.

42 Claims, 16 Drawing Sheets

SWITCHING POWER SUPPLY DEVICE

BACKGROUND OF THE INVENTION

1. Field of the Invention

The present invention relates to a switching power supply device for providing a regulated direct current (DC) power supply.

2. Description of the Related Art

With the miniaturization of electronic equipment, it has been more required for switching power supply devices incorporated in electronic apparatus to have a reduced loss, that is, an enhanced efficiency.

Conventionally, as a switching power supply device which can be constructed with a reduced number of the components at a relatively low cost, an RCC (ringing choke converter) as stated in Japanese Unexamined Utility Model Publication No. 63-100993 has been used.

FIG. 26 is a diagram showing an example of a conventional RCC switching power supply device. In FIG. 26, a transformer is designated by T. A switching element Q1 and an input power source E are connected in series with a primary winding T1 of the transformer T. A secondary winding T2 of the transformer T is provided with a rectifying smoothing circuit formed of a rectifying circuit Ds and a smoothing capacitor $C_0$. A load is connected to the output of the rectifying smoothing circuit. A load is connected to the output of the rectifying smoothing circuit. A detecting circuit 14 detects a load supply voltage. A bias winding T3 of the transformer T is coupled to a controlling circuit 11 for controlling the switching element Q1 in dependence on a 446 voltage produced in the bias winding T3. The controlling circuit 11 causes the switching element Q1 to self-oscillate and control the on-time of the switching element Q1 in dependence on a detected voltage of the detecting circuit 14 through an isolating circuit to regulate the output voltage.

FIG. 27 is a waveform chart at the respective elements shown in FIG. 26. A voltage surge is generated in voltage Vdsl across the switching element Q1 as shown in FIG. 26, since the switching element Q1 is turned off in a state when a current id1 flowing in the switching element Q1 is high. The surge appears in a current flowing in the rectifying element Ds.

It has been pointed out that the conventional RCC switching power supply device has the following problems.

(1) The switching frequency is significantly varied in dependence on an output current. This causes problems such as interference with electronic apparatus and generation of EMI (electromagnetic interference) noises.

(2) The switching loss is large (the switching loss is defined as a product of Vds1 and id1 obtained at turn-on or turn-off of Q1 in FIG. 27).

(3) The energy loss is large, influenced by the leakage inductance of the transformer.

(4) Voltage surge is caused when the switching element is off, as shown in FIG. 27. Accordingly, it is required for the switching element to have a high breakdown voltage.

(5) A voltage surge is caused when the rectifying diode in the secondary is off. Thus, it is necessary that the rectifying diode have high breakdown voltage.

(6) A large reverse recovery loss is caused by the rectifying diode in the secondary circuit.

(7) The EMI noise is large, caused by the switching surge of the switching element and the rectifying diode in the secondary circuit.

In order to solve the EMI noise problem by reducing variation in the switching frequency, especially caused by variation in the output current, a separately-excited fly-back switching power supply device is generally used. The separately-excited fly-back system is characterized in that the switching frequency control and the pulse width control for the switching transistor can be easily carried out.

However, for the separately-excited fly-back system, a separately-excited oscillating circuit needs to be provided for control of the switching transistor. Thus, it is difficult to attain the miniaturization and cost-saving of the device, in contrast to the RCC system.

Japanese Unexamined Patent Publication No. 5-191972 discloses a regeneration control type switching power supply device in which variation in the switching frequency and voltage surge can be inhibited. This regeneration control type switching power supply device has two switching means provided in the circuit thereof. The output voltage is controlled by changing the on/off ratios of the two switching means, and by carrying out the generation action of energy, the variation in the switching frequency, caused by variation in the output current, is inhibited. A regeneration control type switching power supply device of this type is advantageous in that the variation in the switching frequency, caused by the variation in the output voltage, can be inhibited. However, as a result of the generation operation, the change range of a magnetic flux of the transformer is kept substantially constant, irrespective of the output current. This causes problems as follows. In the case where the load is light, the regeneration control type switching power supply device exhibits a larger switching loss at turn-off, as compared with the conventional RCC system switching power supply, since the peak value of the primary current is large immediately before the turn-off. The loss by the transformer is large, since the change range of a magnetic flux in the transformer is maximum. Moreover, since the conduction loss is large, caused by the regeneration current, the power conversion efficiency is low when the load is light. Further, there arises a problem that the conduction loss in the secondary is high, since the peak value of a current flowing in the rectifying element in the secondary is large, and the effective current of the rectifying element in the secondary is high.

For the forgoing reasons, there is a need for a switching power supply device which solves the above-described problems of the RCC system switching frequency power supply device, the separately-excited fly-back system switching power supply device, and the regeneration control type switching power supply device, and which has a high efficiency, low noise, small size and light weight and is produced at a low cost.

SUMMARY OF THE INVENTION

The present invention is directed to a switching power supply device that satisfies this need. The switching power supply device according to an embodiment of the present invention, has a configuration in which the series combination of a first switching circuit and an input power source is connected in series with the series combination of the first winding of a transformer T and an inductor L, the series combination of a second switching circuit and a capacitor C is connected in parallel to the series combination of the primary winding of the transformer T and the inductor L, and the secondary winding of the transformer T is provided with a rectifying smoothing circuit including a rectifying element Ds. The first switching circuit is made up of a parallel connection circuit including a first switching element Q1, a first diode D1, and a first capacitor C1, the second switching circuit is made up of a parallel connection circuit including a second switching element Q2, a second diode D2, and a second capacitor C2, switching controlling circuits adapted to turn the first and second switching elements on and off alternately while a period of time when both switching elements are off is interposed, is provided, and a capacitor Cs is connected in parallel to the rectifying diode Ds in the rectifying smoothing circuit.

The switching power supply device according to another embodiment of the present invention has a configuration in which the series combination of a first switching circuit and an input power source is connected in series with the series combination of the first winding of a transformer T and an inductor L, and the series combination of a second switching circuit and a capacitor C is connected in series with the series combination of the primary winding of the transformer T, the inductor L, and the input power source, and the secondary winding of the transformer T is provided with a rectifying smoothing circuit including a rectifying element Ds. The first switching circuit is made up of a parallel connection circuit including a first switching element Q1, a first diode D1, and a first capacitor C1, the second switching circuit is made up of a parallel connection circuit including a second switching element Q2, a second diode D2, and a second capacitor C2, switching controlling circuits adapted to turn the first and second switching elements on and off alternately while a period of time when both switching elements are off is interposed, is provided, and a capacitor Cs is connected in parallel to the rectifying diode Ds in the rectifying smoothing circuit.

With this configuration, the following operation/working-effect can be obtained.

(1) Since the switching elements Q1 and Q2 are turned on at the zero voltage, and the switching element Q2 is turned off near zero current, the switching loss can be significantly reduced.

(2) The rectifying element Ds in the secondary is turned off at the zero voltage, and its current waveform rises sharply from the zero voltage, reaches a peak point at which the ratio of current change is zero, and then represents a zero current in which the current is off. Accordingly, the waveform of a current flowing in the rectifying element is more nearly the same as a rectangular waveform, so that the peak current is reduced to be low and the effective current is decreased, bringing a reduced conduction loss.

In one aspect, the transformer T is provided with two bias windings, the switching controlling circuits are adapted to control the first switching element Q1 and the second switching element Q2 to self-oscillate, respectively, by inputting voltages substantially in proportion to primary winding voltages produced in the two bias windings, respectively.

By using two bias windings as described above, the switching elements Q1, Q2 with different ground levels can be operated while they are insulated. As it is unnecessary to insulate the switching elements Q1, Q2 by using a pulse transformer, a photocoupler, and so forth, the cost can be reduced. Moreover, as a voltage waveform substantially in proportion to the primary winding voltage of the transformer T is used, the switching element Q2 can be easily operated synchronously with the switching element Q1. In addition, the period of time when both of the switching elements Q1, Q2 are off can be easily provided, so that damage, which may be caused when both of the two switching elements Q1, Q2 are simultaneously on, can be prevented. Moreover, it is unnecessary to use an IC for switching-controlling the switching elements Q1, Q2 by separate-excitation. The switching controlling circuits need not have a complicated configuration. This brings a cost reduction as a whole.

In another aspect, the switching controlling circuits are adapted to control the first switching element Q1 and the second switching element Q2 respectively, by inputting a voltage substantially in proportion to a primary winding voltage produced in one bias winding of the transformer T to turn the first switching element Q1 and the second switching element Q2 on and off alternately, to self-oscillate in dependence on the time when the voltage is positive or negative.

In this configuration, only one bias winding is used. Accordingly, the switching power supply device can be miniaturized and produced at a low cost.

In still another aspect, the rectifying diode Ds is formed of a switching element adapted to switch with a control signal. According to the switching power supply device, the voltage surge can be inhibited, which enables a switching element with low breakdown voltage to be employed as the rectifying element Ds. As a result, the on-resistance of the switching element can be decreased, and thereby the conduction loss in the secondary rectifying circuit can be reduced. In the case that a field-effect transistor is used as the switching element, the parasitic diode and the parasitic capacitor can be used as the diode Ds and the capacitor Cs, respectively. Thus, the number of components can be reduced.

In still another aspect, the primary winding of the transformer T is split into at least two portions, and each of the output terminals of said split primary winding and one end of the primary winding is connected to one of the first or second switching circuits and the other, respectively.

The voltages applied to the switching elements Q1, Q2 are controlled by the split ratio of the primary winding of the transformer T. By setting the split ratio, breakdown voltage and so forth required for the switching elements Q1, Q2 can be decided, so that design flexibility can be enhanced.

In still another aspect, another primary winding, different from the primary winding with which the power source is connected in series, is provided, and the second switching circuit is connected in parallel to the series combination of the further primary winding and the inductor L.

With this configuration, the voltages applied to the switching elements Q1, Q2 are controlled by the ratio of the turns number of the primary winding connected in series with the input power source to the turns number of the further primary winding. By designing the turns ratio, breakdown voltage and so forth required for the switching elements Q1, Q2 can be decided. Thus, design flexibility can be enhanced.

In still another aspect, the transformer T is formed of an inductance element which also acts wholly or partially as the primary winding and the secondary winding of the transformer T. In this case, the switching power supply device is of non-isolation type. A small-size inductance element is available. The miniaturization of the switching power supply device as a whole is realizable. Further, the conversion loss caused by electromagnetic conversion can be reduced. As a whole, the efficiency can be enhanced.

In still another aspect, the switching element is formed of a field-effect transistor. Accordingly, the parasitic diode and the parasitic capacitor can be used as the diode D1 or D2 and the capacitor C1 or C2, respectively. Thus, the number of components can be reduced.

In still another aspect, the inductor L is formed of a leakage inductance of the transformer T. Thus, the number of components can be reduced. Further, since the inductor L is used for the resonant action of energy, the energy loss due to the leakage inductance of the transformer can be reduced.

In still another aspect, as the rectifying element, a diode is used, and the parasitic capacitance of the diode is used as the capacitor Cs. With this configuration, the number of components can be reduced, and miniaturization and low cost are attainable.

In still another aspect, at least two outputs are provided for the secondary winding of the transformer, and each of the two outputs is provided with a rectifying smoothing circuit. Accordingly, the switching power supply device with multi-outputs is configured. One of these outputs for which the feedback is provided directly is a stable output. The other output is a quasi-stable output. Since the energy stored in the inductor L is regenerated, the voltage stabilization characteristic of the quasi-stable output against the variation in load can be improved.

In still another aspect, a capacitor C3 is connected across the secondary winding of the transformer T, across the secondary winding of the transformer T, or in parallel to the series combination of said primary winding and said inductor L. Accordingly, the capacitor connected across the primary winding of the transformer T, or the capacitor connected in parallel to the series combination of the primary winding and the inductor L operates in the same manner as the capacitor C1 connected in parallel to the first switching element Q1 and also the capacitor C2 connected in parallel to the second switching element Q2. The capacitor connected across the secondary winding of the transformer operates in the same manner as the capacitor Cs connected in parallel to the rectifying element Ds. Thus, the resonant conditions in the primary and the secondary can be controlled.

In still another aspect, the switching controlling circuits turns the first switching element Q1 on after the voltage across the capacitor C1 is decreased to or near to the zero voltage. In the switching power supply device defined in claim 15, the switching controlling circuits turns the second switching element Q2 on after the voltage across the capacitor C2 is decreased to or near to the zero voltage.

With this configuration, the switching elements Q1, Q2 carry out the turn-on operation at the zero voltage, which allows the switching loss at turn-on to be reduced.

In still another aspect, the switching controlling circuits control the on-period of the second switching element so that a current flowing in the second switching element Q2 is turned off at zero or near to zero. A current flowing in the second switching element Q2 is the sum of a current flowing in the rectifying element Ds and an exciting current flowing in an equivalent excitation inductance of the transformer. Accordingly, the on-period of the second switching element caused by the switching controlling circuits is so set that the waveform of a current flowing in the rectifying element Ds rises nearly at the zero, reaches a peak point at which the ratio of current change is zero, and then represents the zero current at which the current is turned off. Thus, the switching element Q2 carries out the turn-off operation nearly at the zero current, so that the switching loss at turn-off is reduced.

In still another aspect, the on-period of the second switching element caused by the switching controlling circuits are so set that the waveform of a current flowing in the rectifying element Ds rises nearly at the zero, reaches a peak point at which the ratio of current change is zero, and then represents the zero current at which the current is turned off, by using the resonant conditions of the inductor L and the capacitor C. Accordingly, since the current flowing in the rectifying element Ds is prevented from changing steeply, the switching loss and the reverse recovery loss can be reduced. In addition, the peak current is decreased, which reduces the effective current and the conduction loss.

In still another aspect, the capacitance of the capacitor Cs is so set that the capacitor Cs is resonant with the secondary winding of the transformer T when the switching element Q1 or the switching element Q2 is off, so that the waveform of voltage across the capacitor Cs forms a part of a sinusoidal waveform, and rises at the zero voltage or falls toward the zero voltage. Accordingly, the voltage across the capacitor Cs is prevented from changing steeply, so that the switching loss and the reverse recovery loss of the rectifying element Ds can be reduced.

In still another aspect, the switching controlling circuits control the voltage of an output from said rectifying smoothing circuit by changing the on-time of the first switching element Q1 and further change the on-time of the second switching element Q2 in dependence on the quantity of a load connected to an output of said rectifying smoothing circuit so that the excitation quantity of the transformer in the reverse direction becomes zero or predeterminately constant. Accordingly, when the excitation quantity is controlled to have a minimum value required for the switching at the zero voltage, the conduction period of the first diode D1 becomes substantially absent, that is, the conduction loss is substantially eliminated. Thus, the conduction losses by the switching elements Q1, Q2, the diode D2, the transformer T, and so forth can be reduced. The operation at high efficiency can be achieved in the range from a light to a heavy load.

In still another aspect, the switching controlling circuits voltage-control an output from the rectifying smoothing circuit by changing the on-time of the first switching element Q1 and the ratio of an excitation quantity of the transformer T in the reverse direction to the excitation quantity in the forward direction in dependence on the quantity of a load connected to an output of the rectifying smoothing circuit. Accordingly, the on-time of the first switching element Q1 at a light load can be inhibited from shortening, so that the variation range of the switching frequency is relatively reduced. The operation at high efficiency can be achieved in the range from a light to a heavy load.

According to the switching power supply device the switching controlling circuits control the voltage of an output from the rectifying smoothing circuit and make the on-time of the second switching circuit Q2 substantially constant by changing the ratio of an excitation quantity of the transformer T in the reverse direction to the excitation quantity in the forward direction in dependence on the quantity of a load connected to an output of the rectifying smoothing circuit. Thus, the on-off period of Q2 is made substantially constant. Accordingly, the switching frequency can be kept substantially constant, and the switching power supply device can be applied in a power supply circuit wherein the variation range of a switching frequency is restricted.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
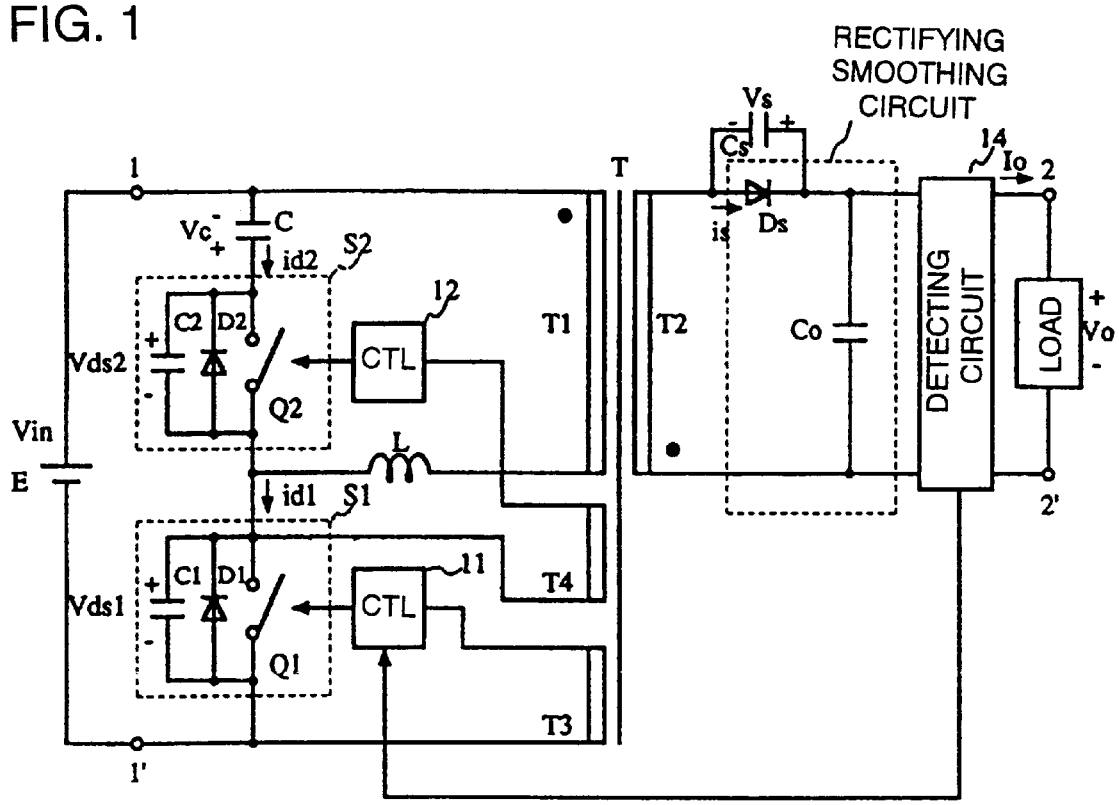
FIG. 1 is a diagram showing the configuration of a switching power supply device according to a first embodiment of the present invention.

FIG.1 is a diagram showing the configuration of a switching power supply circuit according to a first embodiment of the present invention. In FIG. 1, a transformer is designated by T. The series combination of a first switching circuit S1 and an input power supply E is connected series with the series combination of the primary winding T1 and an inductor L. The series combination of a second switching circuit S2 and a capacitor C is connected in parallel to the series combination of the primary winding T1 and the inductor L. The secondary winding T2 of the transformer T is provided with a rectifying smoothing circuit made up of a rectifying diode Ds and a smoothing capacitor Co.

In FIG. 1, the first switching circuit S1 is formed of a parallel connection circuit including a first switching element Q1, a first diode D1, and a first capacitor C1. The second switching circuit S2 is formed of a parallel connection circuit including a second switching element Q2, a second diode D2, and a second capacitor C2 connected in parallel. The transformer T is provided with two bias windings T3, T4. Controlling circuits 11, 12 for controlling the switching elements Q1, Q2 are connected to the bias windings T3, T4, respectively. A capacitor Cs is connected in parallel to the rectifying diode Ds in the secondary. The detecting circuit 14 detects an output voltage Vo, and an output current Io, if necessary, to be supplied to the load. The controlling circuit 11 provides a positive return to the switching element Q1, inputting a voltage produced in the bias winding T3 into the switching element Q1, so that the switching element Q1 self-oscillates. A detecting signal from the detecting circuit 14 is inputted, through an isolating circuit, if necessary, into the controlling circuit 11, so that the off-timing of the switching element Q1 is controlled in dependence on the difference of the detecting signal from a standard voltage, that is, the on-time of Q1 is controlled. The controlling circuit 12 controls the off-timing of the switching element Q2, that is, controls the on-time of Q2 by inputting a voltage produced in the bias winding T4 into the switching element Q2. The controlling circuit 12 controls the on-time of the second switching element Q2 by inputting a detecting signal from the detecting circuit 14, if necessary. The on-time control of Q1, Q2 will be described later in details.

The above controlling circuits 11, 12 so control Q1, Q2 that Q1, Q2 are turned on and off alternately, while a period of time when both Q1 and Q2 are off is interposed. With this configuration, it is unnecessary to employ an IC for switching-control, in contrast to the case of a separately-excited oscillation type fly-back converter, and so forth. Thus, the configurations of the controlling circuits 11, 12 can be simplified.

The inductor L is a leakage inductance of the transformer T, though shown as a circuit element in the diagram. In order to control the resonant frequency (period) of the inductor L and the capacitor C to a predetermined value, an inductor other than the transformer T may be connected in series with the primary winding of the transformer T.

FIGS. 22A to 22C and 24 are waveform charts at the respective elements of the circuit shown in FIG. 1. The operation of the circuit will be now described with reference to FIG. 1 and FIG. 24.

Figure 24:
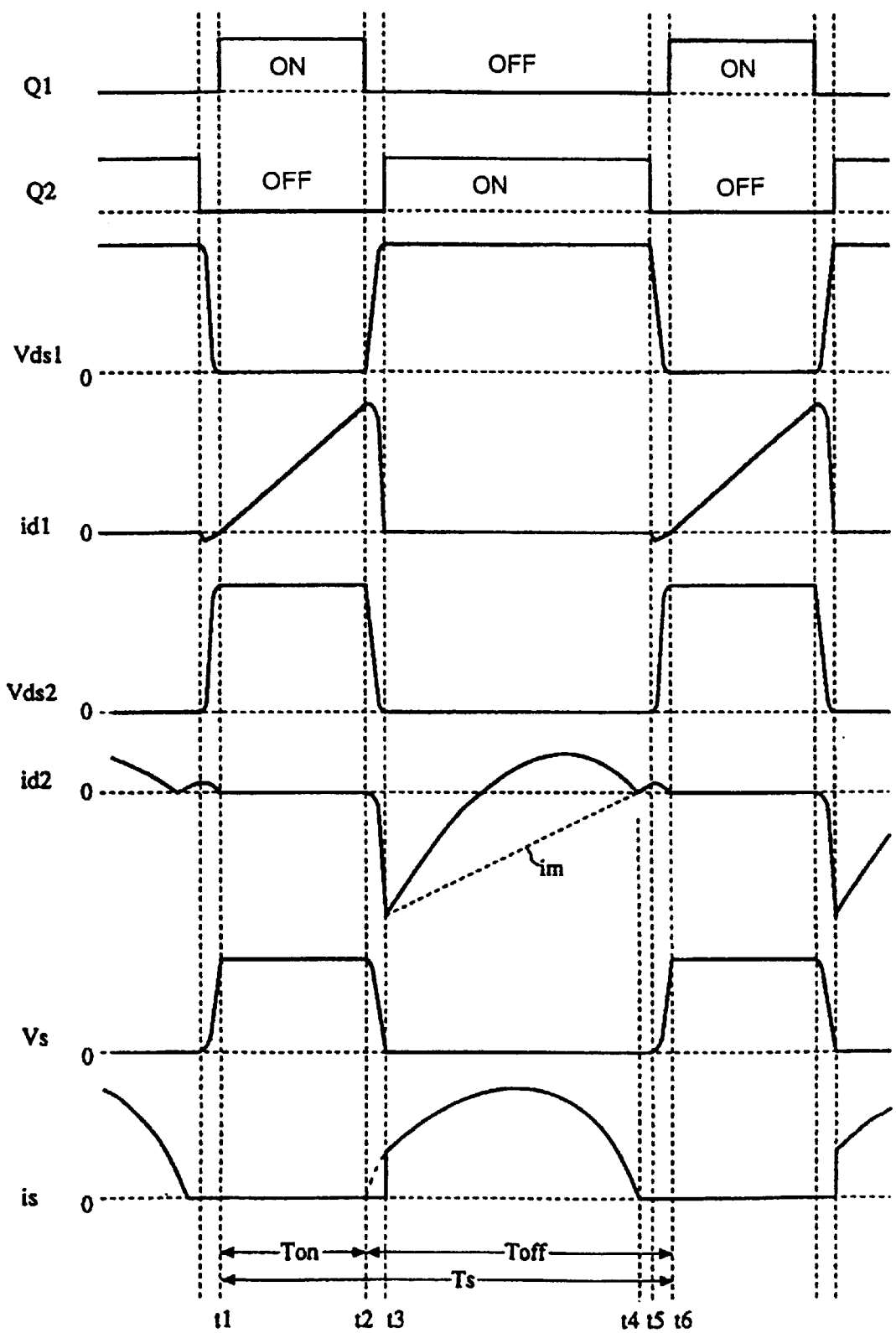
FIG. 24 are voltage/current waveform charts showing examples of change in switching frequency against output current in the respective embodiments.

In FIG. 24, Q1, Q2 designate signals representing the on-off operation of the switching elements Q1, Q2. Vds1, Vds2, and Vs designate waveform signals of voltages across C1, C2, and C3, respectively. id1, id2, and is represent the current waveform signals of the switching circuits S1, S2, and the rectifying element Ds.

The operation of this circuit may be divided into five operating states with respect to time t1–t6 in one switching period Ts. The operation of this circuit in the respective states will be now described.

<STATE 1>t1–t2

The switching element Q1 is on. An input voltage is applied to the primary winding of the transformer T to increase linearly the current flowing in the primary winding of the transformer T, resulting in storage of excitation energy in the transformer T. At time t2, the switching element Q1 is turned off, so that the state transitions into STATE 2.

<STATE 2>t2–t3

When the switching element Q1 is turned off, the primary winding of the transformer T and the inductance L become resonant with the capacitor C1 and the capacitor C2, so that the capacitor C1 is charged and the capacitor C2 is discharged. In the secondary, the secondary winding of the transformer T becomes resonant with the capacitance Cs, so that the capacitor Cs is discharged. The leading edge of the curve of Vds1 is a part of a sinusoidal wave caused by C1 and L with the primary winding T1 and the inductor. The trailing edge of id1 is the same waveform as Vds1 leading id1 by a phase difference of 900.

When Vds2 across the capacitor C2 is reduced to the zero voltage, the diode D2 conducts, turning the switching element Q2 on. That is, the zero voltage switching operation is carried out. The state transitions into STATE 3. The trailing edge of the curve of Vds2 is a part of a sinusoidal waveform caused by the resonance of C2 and L with the primary winding T1 and the inductor. The trailing edge of id2 is the same waveform as Vds2 leading id2 by a phase difference of 90°. In this case, in the secondary, the voltage Vs across the capacitance Cs is reduced to zero voltage, and the rectifying element Ds conducts. That is, the zero voltage turn-on operation is carried out. The curve corresponding to the leading edge of Vs is a part of a sinusoidal waveform caused by the resonance of Cs with the inductor of the secondary winding T2. The broken line of is represents the current flowing in Cs when the rectifying element Ds is off.

<STATE 3>t3–t4

In STATE 3, the diode 2 or the switching element Q2 conducts, and the inductance L and the capacitor C begins to resonate. Then, in the secondary, the rectifying element Ds conducts, and excitation energy stored in the transformer T is released from the secondary winding, and outputted through the rectifying smoothing circuit. Then, values of the current is flowing in the rectifying element Ds are symmetric with respect to values obtained by subtracting the excitation current im decreasing linearly from the resonance current id 2 caused by the primary inductance L and capacitor C. Accordingly, the current is rises at the zero current and takes a waveform like a sinusoidal curve. The current is, after it reaches a peak point at which the change rate of current is zero, and decreases toward the zero current. At t4, the excitation current im of the transformer and the current id 2 have a relationship of im=id 2. When the current is in the secondary becomes zero, the rectifying element Ds is turned off. Thus, the zero current turn-off operation of the rectifying element Ds is realized. STATE 3 is completed.

<STATE>t4–t5

When the rectifying element Ds is turned off, the resonance of the capacitor C and the inductance L is completed in the primary. Only the excitation current im flows, caused by discharge of the capacitor C, so that the transformer T is excited in the reverse direction with respect to STATE 1. The current id 2 increasing linearly between t4 and t5 represents the excitation current im.

<STATE>t5–t6

At t5, the switching element Q2 is turned off, so that the primary winding of the transformer T and the inductance L become resonant with the capacitors C1 and C2. As a result, the capacitor C1 is discharged, while the capacitor C2 is charged. In the secondary, the transformer T becomes resonant with the capacitor Cs, so that the capacitance Cs is charged.

When the voltage Vds1 across the capacitor C1 decreases to the zero voltage, the diode D1 conducts. At t6, the switching element Q1 is turned off. Thus, the zero voltage switching operation is realized. STATE 5 is completed. On the other hand, in the secondary, the voltage Vs across the capacitor Cs rises from the zero voltage, and is clamped at the voltage equal to the sum of the secondary winding voltage and the output voltage.

The above operation is carried out in one switching period. The same operation is carried out in the next switching period. Then, this operation is repeated.

According to the above-described switching power supply circuit, the switching loss can be significantly reduced, since the switching elements Q1, Q2 are turned on at the zero voltage, and the switching element Q2 is turned off nearly at the zero current. The rectifying element Ds in the secondary is turned on at the zero current, and its waveform rises from the zero current relatively sharply, reaches a peak point at which the rate of current change is zero, and then represents the zero current at which the current is turned off. Thus, the waveform of a current flowing in the rectifying element is substantially rectangular. The peak current is kept low, and the effective current is reduced. Accordingly, the conduction loss can be reduced.

Figure 2:
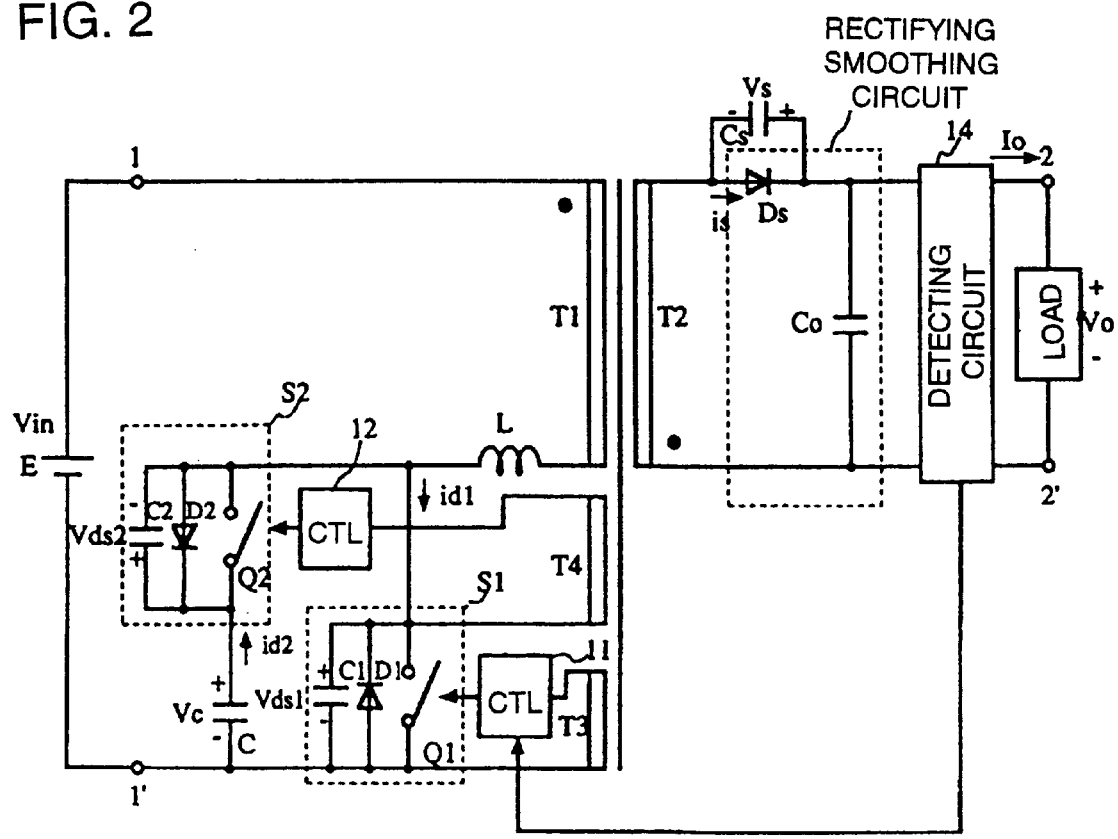
FIG. 2 is a diagram showing the configuration of a switching power supply device according to a second embodiment of the present invention.

FIG. 2 is a diagram showing the configuration of a switching power supply circuit according to a second embodiment of the present invention. In this figure, the series combination of the second switching circuit S2 and the capacitor C is connected in series with the primary winding T1 of the transformer, the inductor L, and the input power source E. As is evident in comparison with the circuit of FIG. 1, this circuit has a configuration in which the input power source E is further connected in series with the series combination of the primary winding T1 of the transformer, the second switching circuit S2, and the capacitor C, and the current id 2 is permitted to flow in the second switching circuit through the input power source. Other operation of this circuit is similar to that as described wit reference with FIG. 1.

Figure 3:
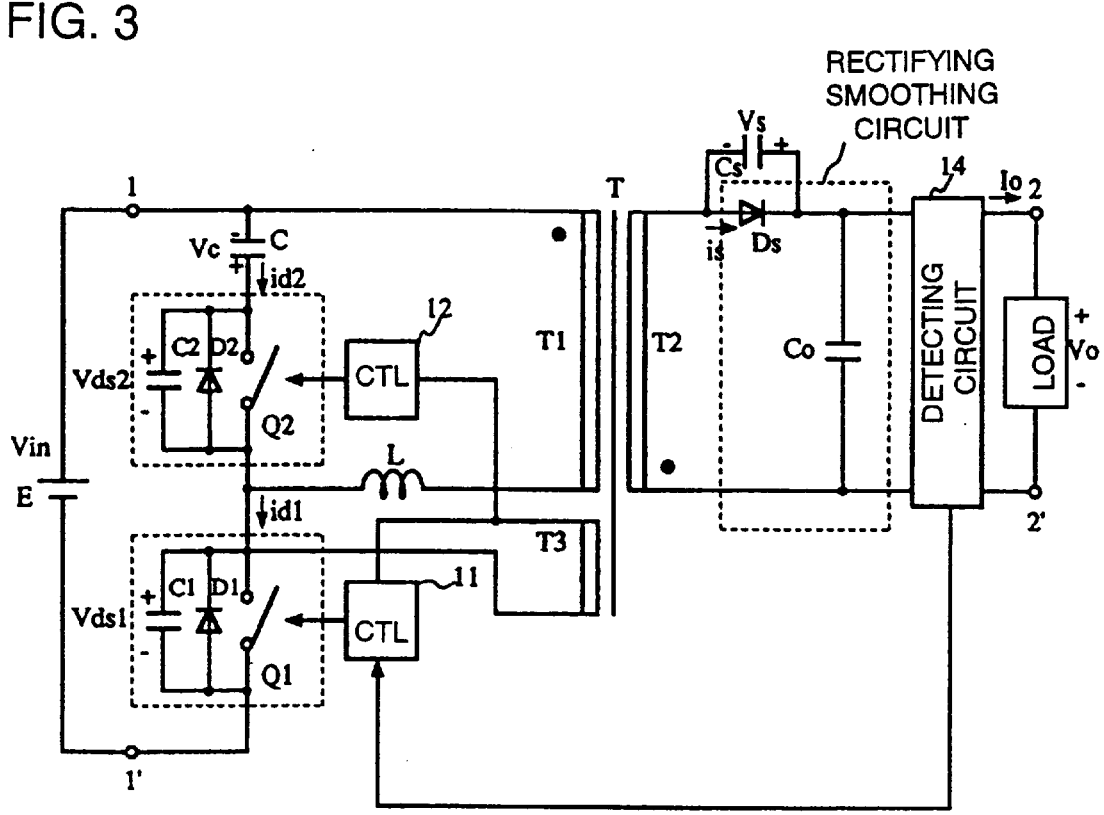
FIG. 3 is a diagram showing the configuration of a switching power supply device according to a third embodiment of the present invention.

FIG. 3 is a diagram showing the configuration of a switching circuit according to a third embodiment of the present invention. In the configuration of the switching power supply circuit, the bias winding T3 of the transformer T is used as a common element, and the controlling circuits 11, 12 control the switching elements Q1, Q2, respectively. More particularly, by inputting a voltage produced in the bias winding T3, and which is substantially proportional to a voltage in the primary winding T1, the controlling circuits 11, 12 control, for example, turning Q1 on when the voltage is positive, and turning Q2 on when the voltage produced in the bias winding T3 is negative. Thus, Q1, Q2 are turned on and off alternately, by self-oscillation, carrying out the operation as illustrated in FIG. 24. In this circuit, there is no state that both Q1, Q2 are on. Q1, Q2 are turned on and off alternately, automatically. Accordingly, the configurations of the controlling circuits 11, 12 can be simplified. Moreover, a transformer provided with one bias winding is available, which assists in miniaturization and cost-saving.

Figure 4:
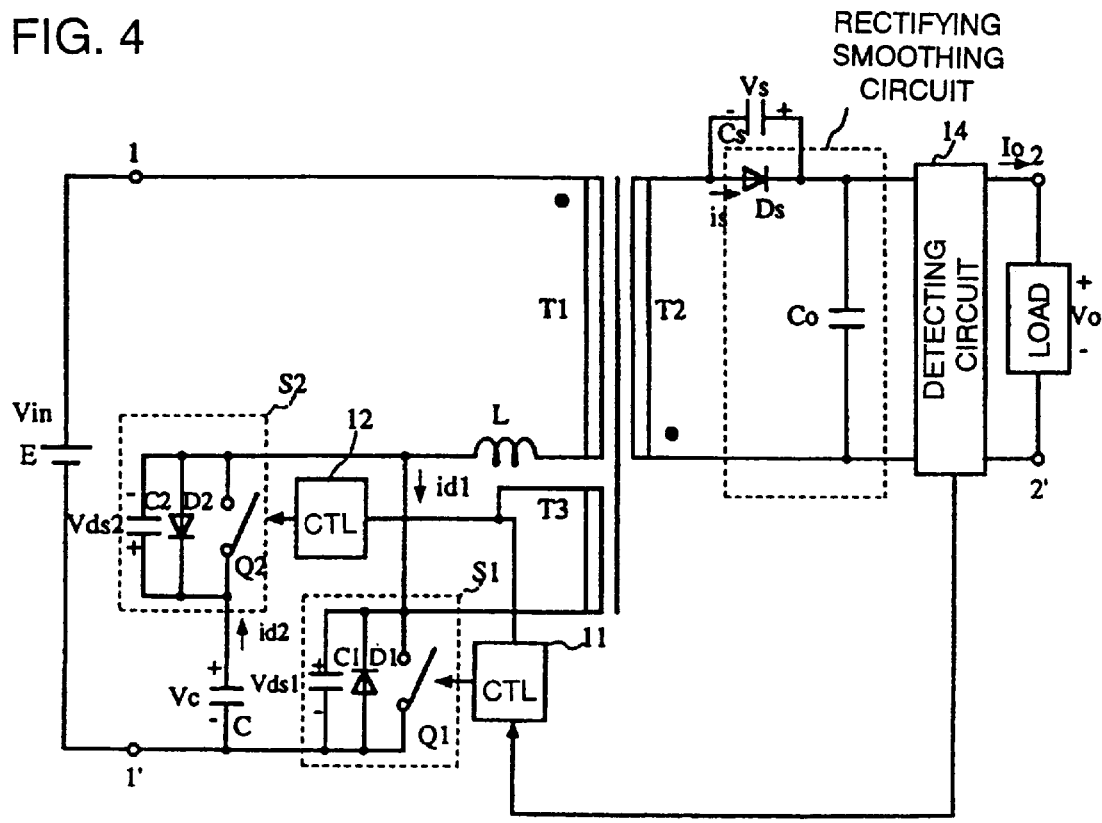
FIG. 4 is a diagram showing the configuration of a switching power supply device according to a fourth embodiment of the present invention.

FIG. 4 is a diagram showing the configuration of a switching circuit according to a fourth embodiment of the present invention. In this configuration, the series combination of the second switching circuit S2 and the capacitor C as shown in FIG. 3 is connected in series with the series combination of the primary winding T1 of the transformer, the inductor L, and the input power source E. Accordingly, the operation of the circuit is similar to that as described with reference to FIG. 3.

Figure 5:
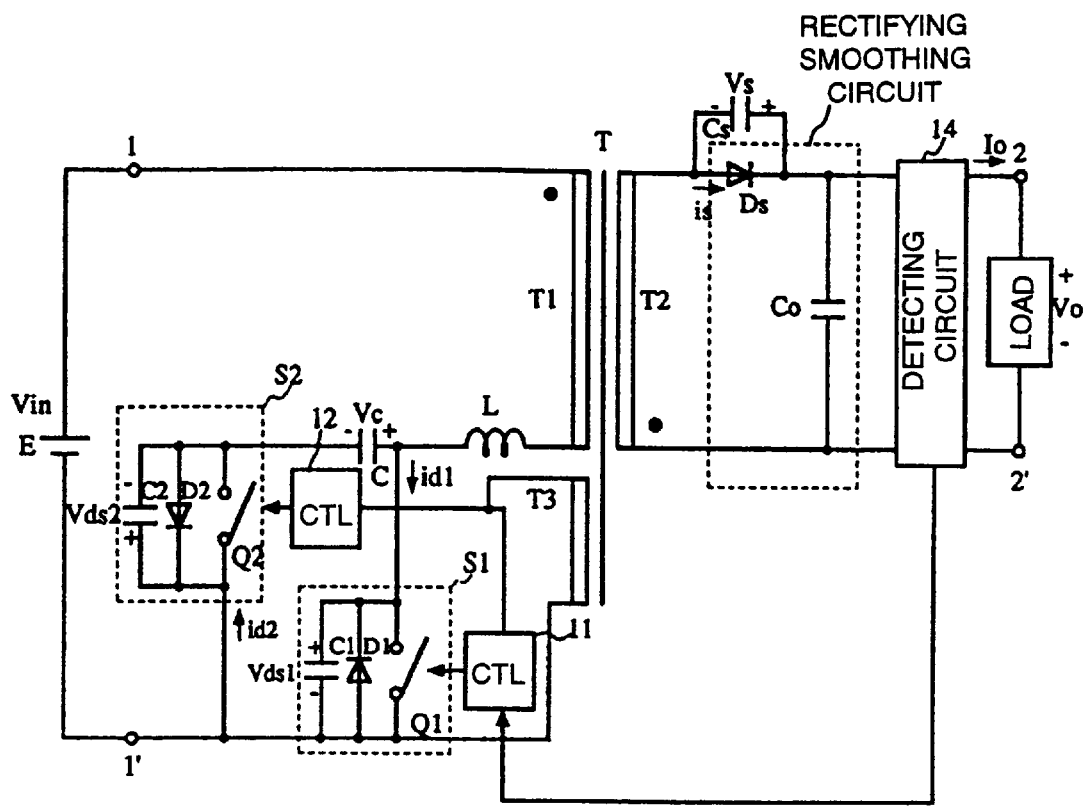
FIG. 5 is a diagram showing the configuration of a switching power supply device according to a fifth embodiment of the present invention.

FIG. 5 is a diagram showing the configuration of a switching circuit according to a fifth embodiment of the present invention. In this circuit, the respective one-side terminals of the bias winding T3, the first switching circuit S1, and the second switching circuit S2 are connected in common. With this configuration, the controlling circuits 11, 12 can control based on a common potential as a reference. Thus, the configurations of the controlling circuits 11, 12 can be simplified.

Figure 6:
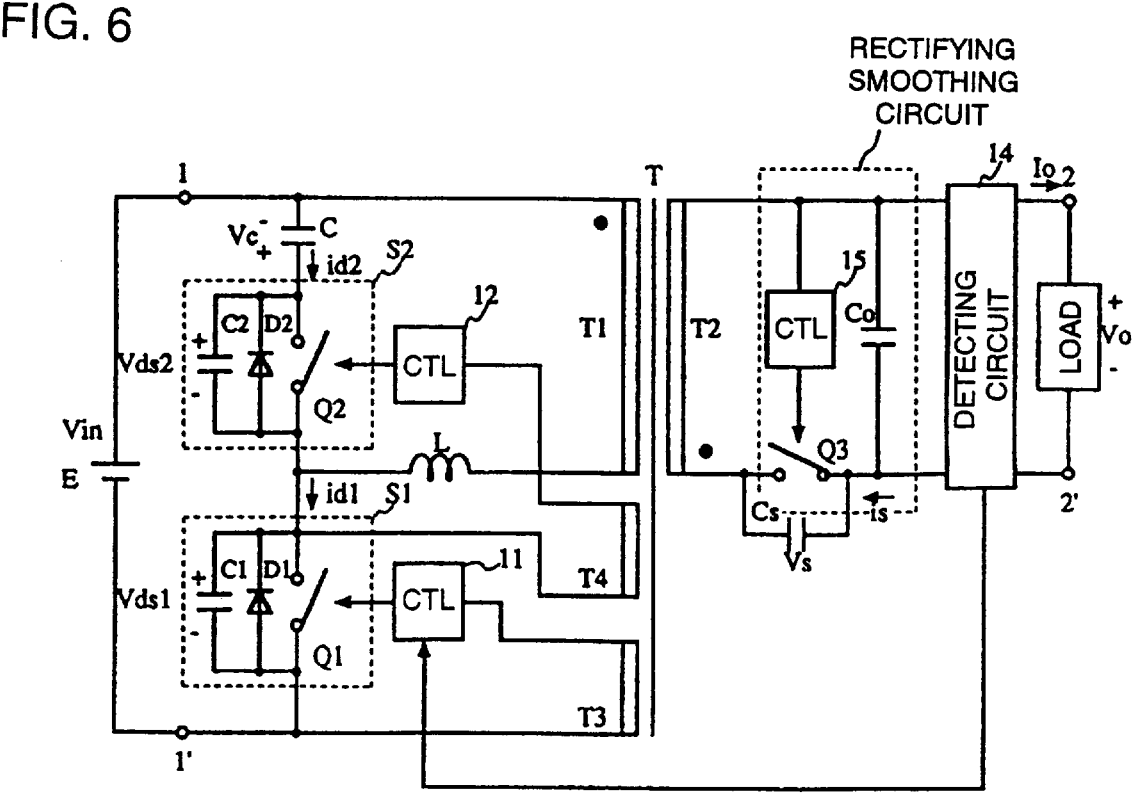
FIG. 6 is a diagram showing the configuration of a switching power supply device according to a sixth embodiment of the present invention.
Figure 20:
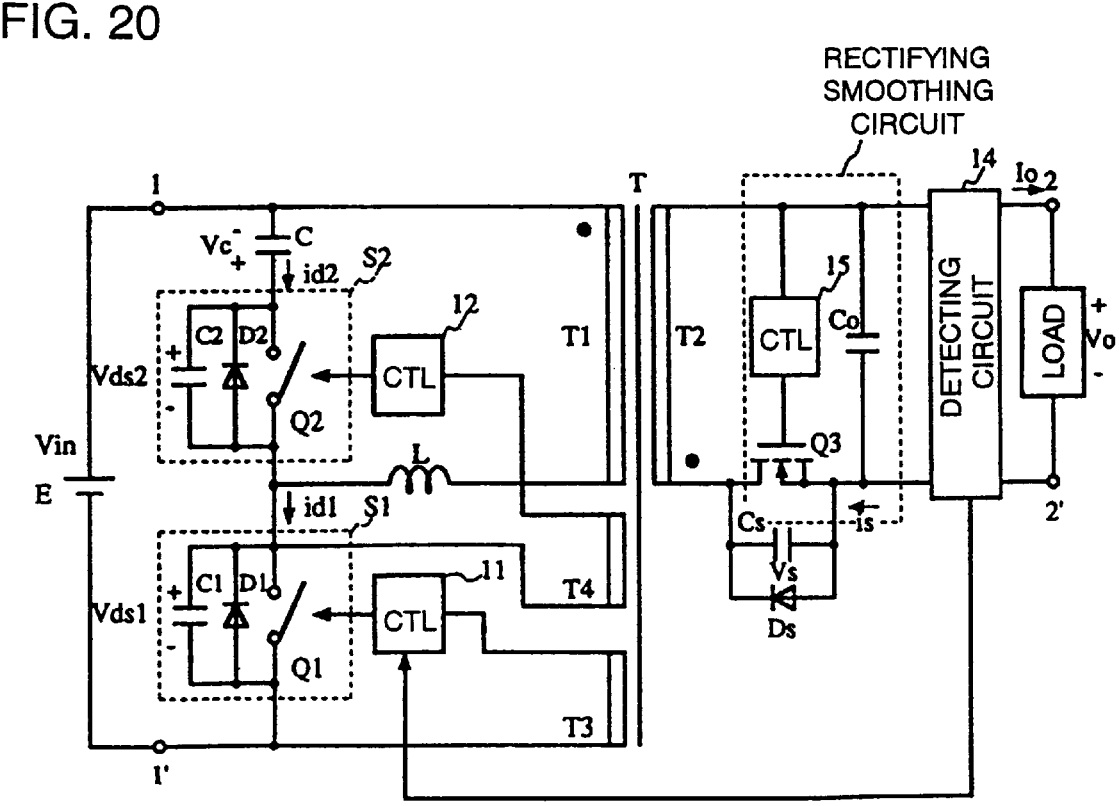
FIG. 20 is a diagram showing the configuration of a power supply device according to the sixth embodiment of the present invention.

FIGS. 6, 20 are diagrams showing the configurations of a switching power supply circuit according to a sixth embodiment of the present invention. In these embodiments, as the rectifying element in the secondary, a switching element Q3 is used. The controlling circuit 15 carries out the on-off control of the switching element Q3 in dependence on a voltage produced in the secondary winding T2 of the transformer. This circuit carries out synchronous rectification. In FIG. 6, its general configuration is shown. In FIG. 20, a MOS-FET is used as the switching element Q3 shown in FIG. 6, which enables the conduction loss to decrease with the loss in the rectifying circuit. In FIG. 20, Ds, Cs designate a parasitic diode of MOS-FET and its parasitic capacitance, respectively.

Figure 7:
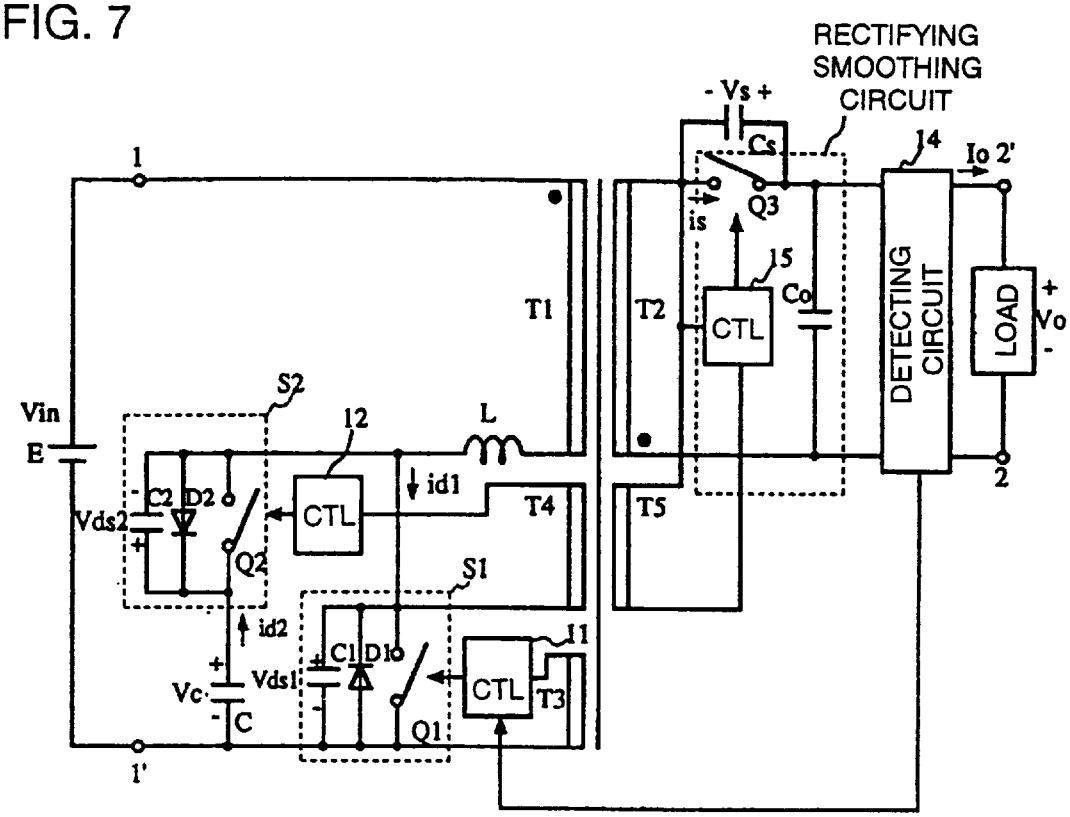
FIG. 7 is a diagram showing the configuration of a switching power supply device according to a seventh embodiment of the present invention.
Figure 21:
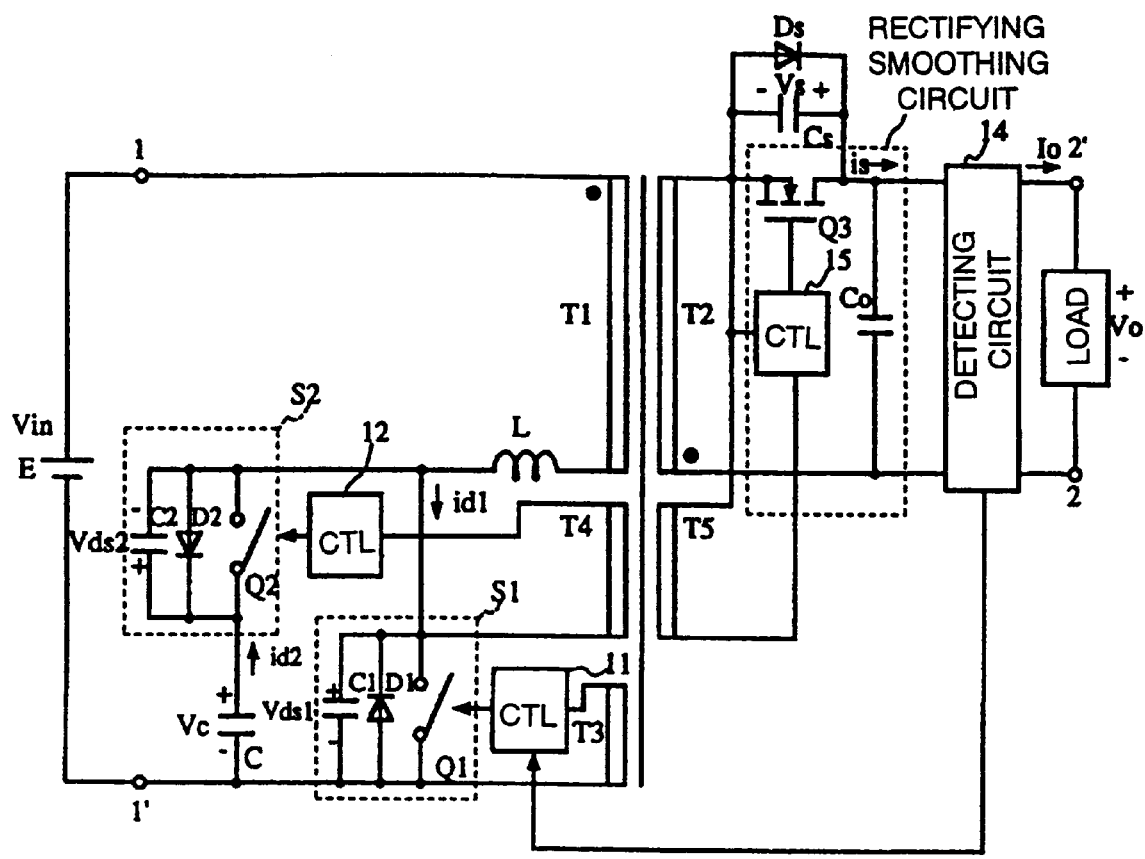
FIG. 21 is a diagram showing the configuration of a power supply device according to the seventh embodiment of the present invention.

FIGS. 7, 21 are diagrams showing the configurations of a switching power supply circuit according to a seventh embodiment of the present invention. In these embodiments, the controlling circuit 15 controls the switching element Q3 by inputting a voltage substantially proportional to a primary winding voltage produced in the bias winding T5 of the transformer T. In the embodiments, the series combination of the second switching circuit S2 and the capacitor C is connected in series with the series combination of the primary winding T1 of the transformer, the inductor L, and the input power source E. In FIG. 7, its general configuration is shown. In FIG. 21, a MOS-FET is used as the switching element Q3 shown in FIG.7, and thereby the conduction loss is reduced, resulting in a reduced loss of the rectifying circuit. In FIG. 21, Ds, Cs designate a parasitic diode of MOS-FET and its parasitic capacitance, respectively.

Figure 8:
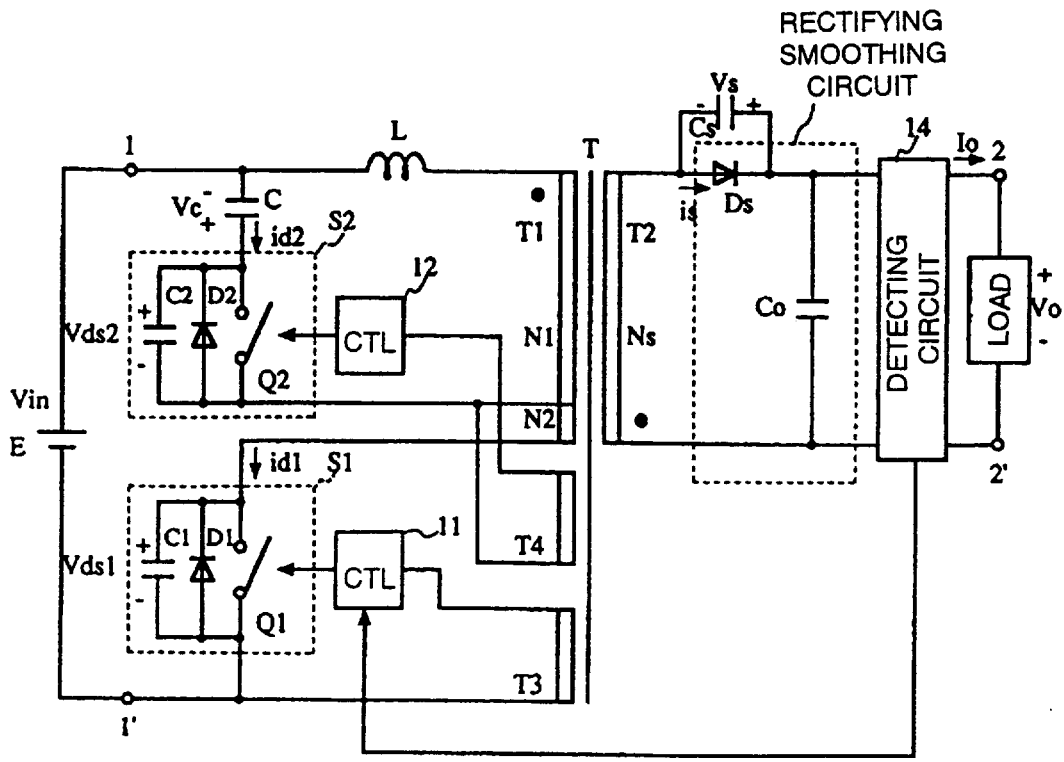
FIG. 8 is a diagram showing the configuration of a switching power supply device according to a eighth embodiment of the present invention.

FIG. 8 is a diagram showing the configuration of a switching power supply circuit according to an eighth embodiment of the present invention. In this circuit, the primary winding T1 is split into two portions via a tap, the portions represented by N1 and N2 which are the numbers of turns N1, N2 of the primary winding T1 of the transformer T. The split output is connected to one terminal of the switching circuit S2. One terminal of the primary winding T1 is connected to one terminal of the switching circuit S1. The voltage across the switching circuit S1 is expressed as Vin+(Vo/Ns)(N1+N2), and the voltage across the switching circuit S2 is expressed as Vo•N1/Ns+Vin•N1/(N1+N2), in which Vin, Vo, and Ns designate the voltage of the input power source E, the output voltage, and the number of turns of the secondary winding T2, respectively.

Accordingly, the voltages to be impressed on the switching circuits S1, S2 are changed with the numbers of turns N1, N2. For example, in the case that N1+N2 is constant, as N1 is decreased, a switching element with lower breakdown voltage is available as Q2.

Figure 9:
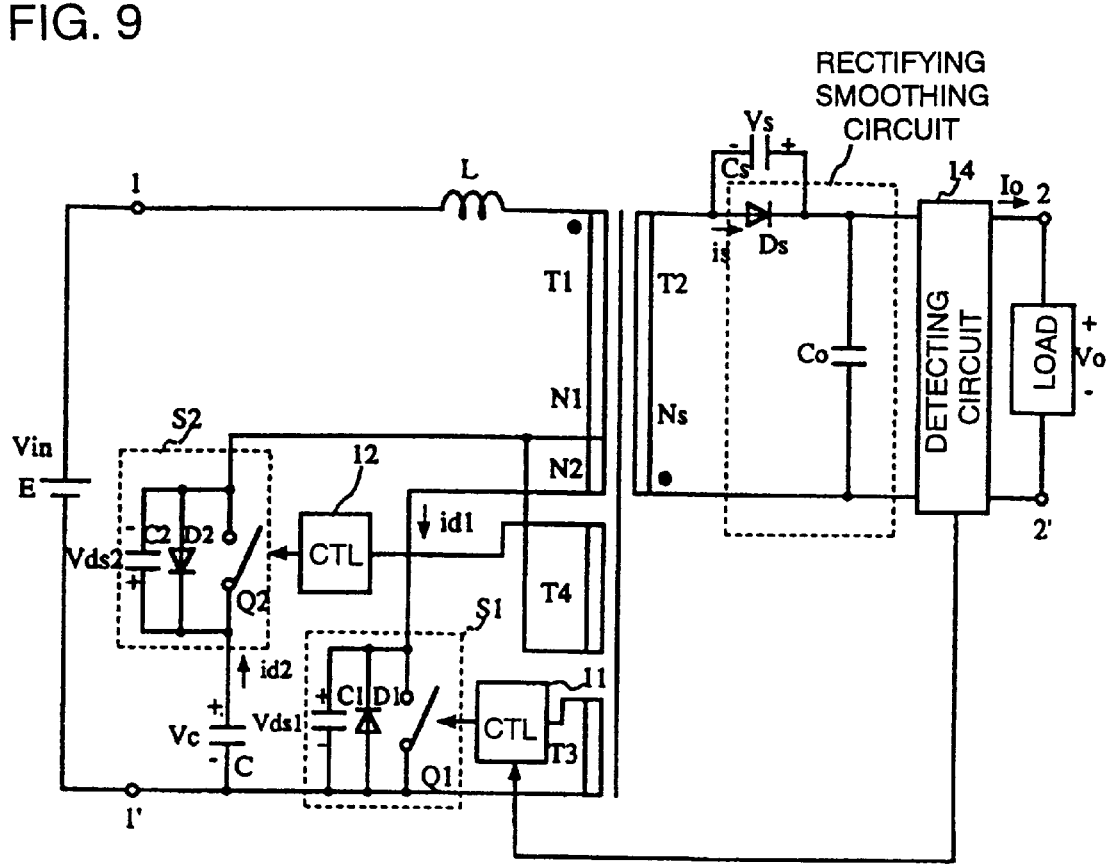
FIG. 9 is a diagram showing the configuration of a switching power supply device according to a ninth embodiment of the present invention.

FIG. 9 is a diagram showing the configuration of a switching power supply circuit according to a ninth embodiment of the present invention. In this circuit, the series combination of the second switching circuit S2 and the capacitor C is connected in series with the series combination of the primary winding, the inductor L, and the input power source E. The operation/working-effect is similar to that as described with reference to FIG. 8.

Figure 10:
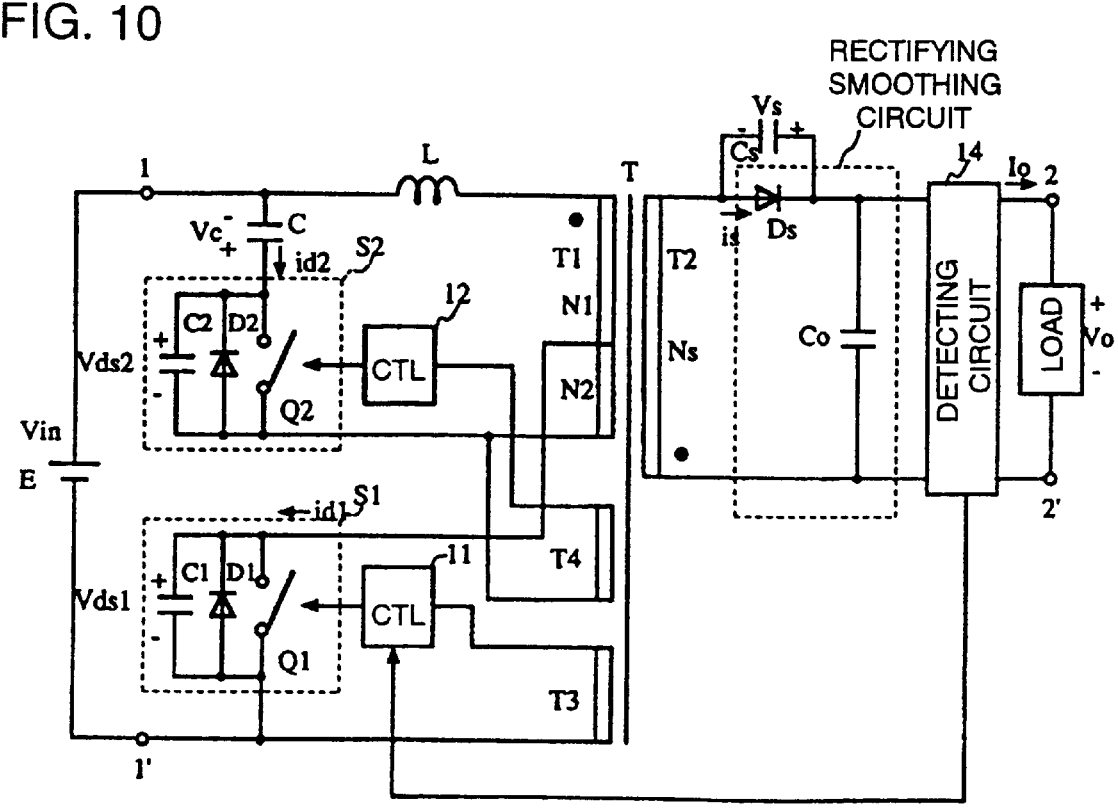
FIG. 10 is a diagram showing the configuration of a switching power supply device according to a tenth embodiment of the present invention.

FIG. 10 is a diagram showing the configuration of a switching power supply circuit according to a tenth embodiment of the present invention. In this embodiment, the split point of the tapped primary winding T1 is connected to one terminal of the first switching circuit S1, while one terminal of the primary winding T1 is connected to one terminal of the second switching circuit S2. In this case, the voltage across the switching circuit S1 is expressed as Vin+Vo•N1/Ns, and the voltage across the switching circuit S2 is expressed as Vo (N1+N2)/Ns+Vin•(Ni+N2)/N1. Accordingly, in the case that N1+N2 is constant, as N1 is decreased, a switching element with lower breakdown voltage is available as the switching element Q1.

Figure 11:
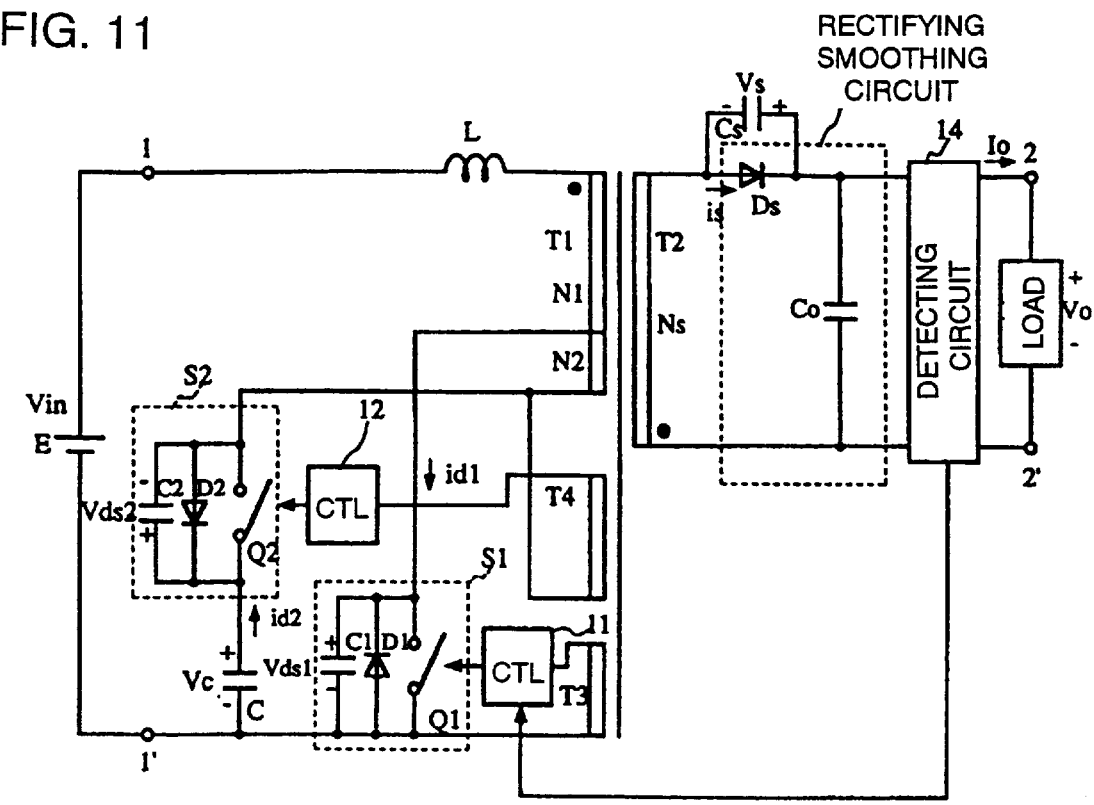
FIG. 11 is a diagram showing the configuration of a switching power supply device according to an eleventh embodiment of the present invention.

FIG. 11 is a diagram showing the configuration of a switching power supply circuit according to an eleventh embodiment of the present invention. The series combination of the second switching circuit S2 and the capacitor C is connected in series with the series combination of the primary winding T1, the inductor L, and the input power source E. The operation/working-effect is similar to that as described with reference to FIG. 10.

Figure 12:
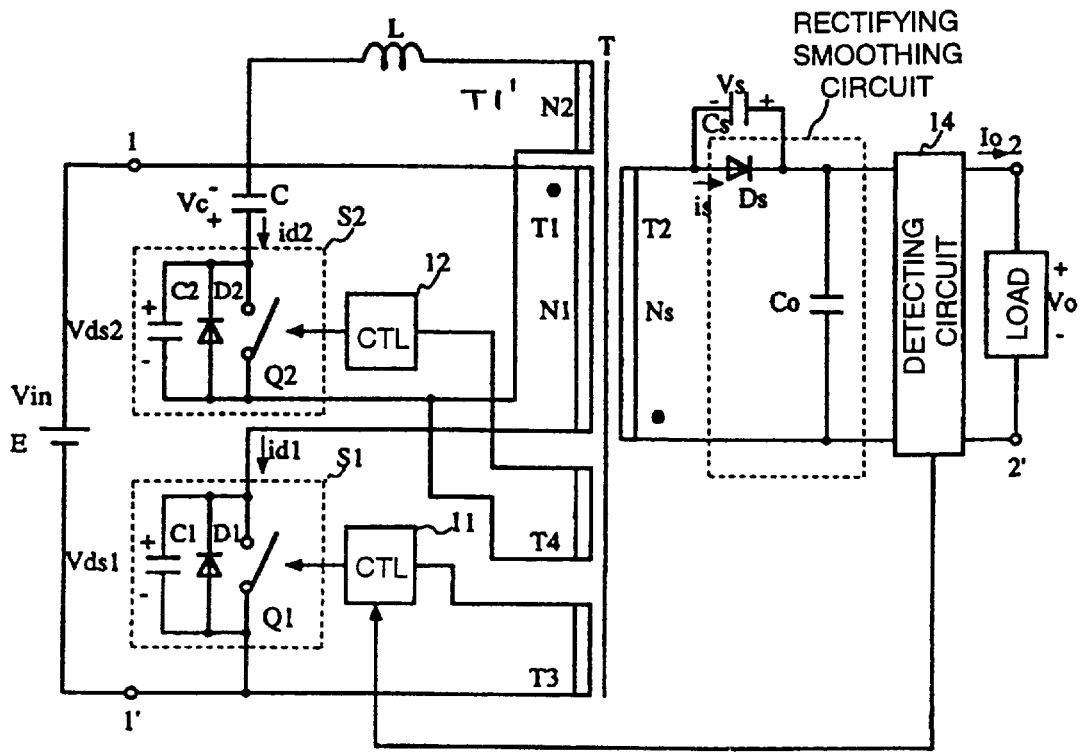
FIG. 12 is a diagram showing the configuration of a switching power supply device according to a twelfth embodiment of the present invention.

FIG. 12 is a diagram showing the configuration of a switching power supply circuit according to a twelfth embodiment of the present invention. In this circuit, the transformer T includes a primary winding T1' in addition to the primary winding T1. The series combination of the second switching circuit S2 and the capacitor C is connected in series with the primary winding T1' and the inductor L. The voltage across the switching circuit S1 is expressed as Vin+Vo•N1/Ns+Vin•N2/N1, and the voltage across the switching circuit S2 is done as Vo•N2/Ns, in which N1, N2, and Ns designate the number of turns of the primary winding T1, the number of turns of the another primary winding T1', and the number of turns of the secondary winding T2. Accordingly, voltages to be impressed onto the switching elements Q1, Q2 can be changed by setting the turn ratio of the primary windings T1 to T1'.

Figure 13:
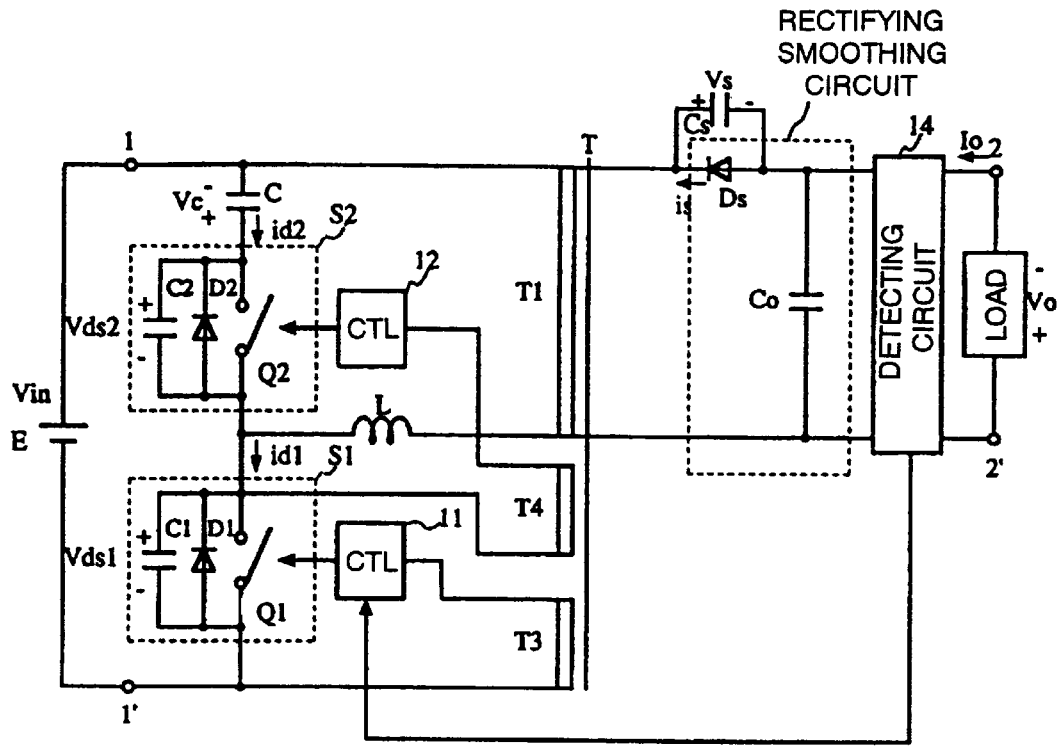
FIG. 13 is a diagram showing the configuration of a switching power supply device according to a thirteenth embodiment of the present invention.

FIG. 13 is a diagram showing the configuration of a switching power supply circuit according to a thirteenth embodiment of the present invention. In this configuration, the winding T1 portion of the transformer T is used as an inductor, and the primary and the secondary are directly connected to each other. In the case of a switching power supply circuit in which the primary and the secondary need not be isolated, a compact transformer (inductor) can be used by configuring such a non-insolation type switching power supply circuit as described above. In addition, the electromagnetic conversion efficiency is enhanced. Thus, a switching power supply circuit miniaturized as a whole, having high efficiency, is attainable.

Figure 14:
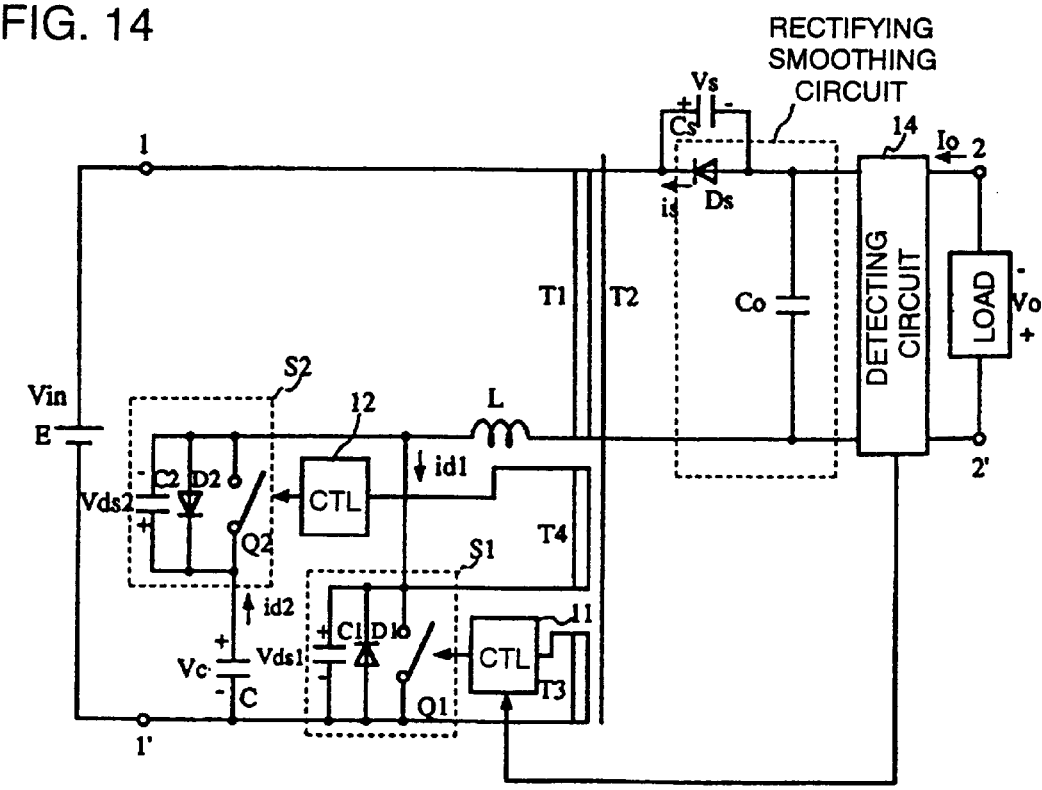
FIG. 14 is a diagram showing the configuration of a switching power supply device according to a fourteenth embodiment of the present invention.

FIG. 14 is a diagram showing the configuration of a switching power supply circuit according to a fourteenth embodiment of the present invention. In this embodiment, the series combination of the second switching circuit S2 and the capacitor C is provided at such a position as to be connected in series with the series combination of the inductor designated by T1, the inductor L, and the input power source E. The operation/working-effect of this circuit is similar to that as described with reference to FIG. 13.

Figure 15:
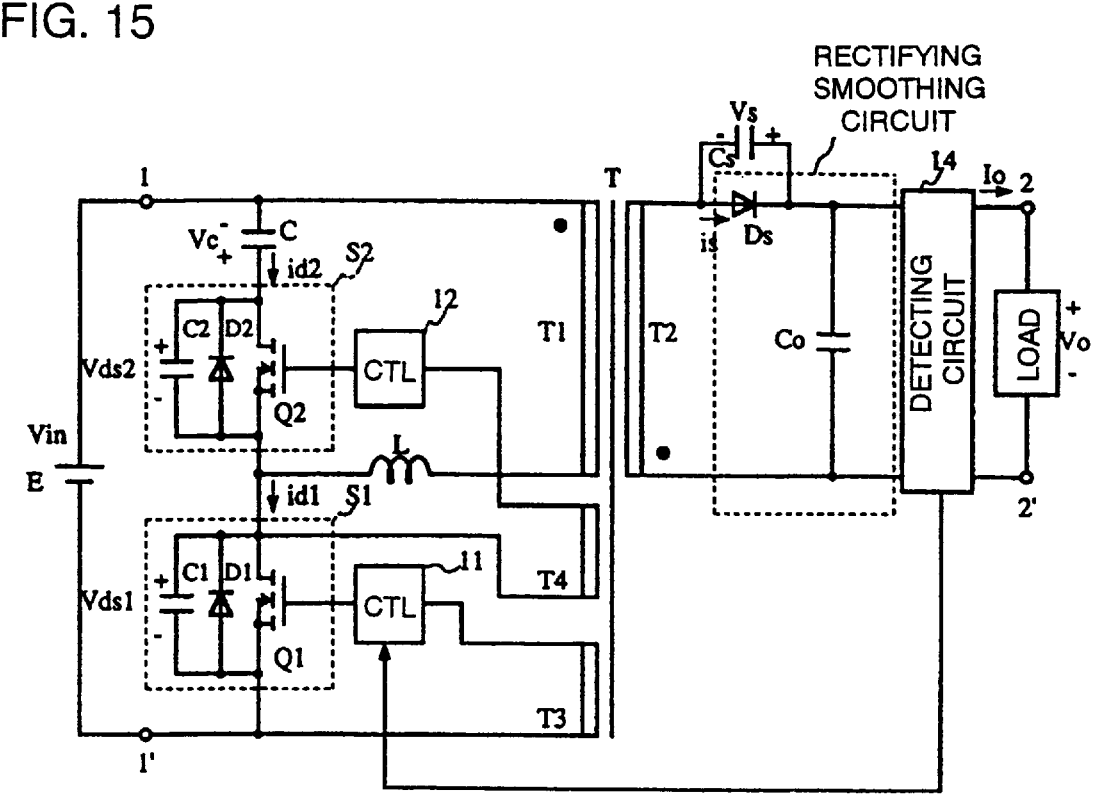
FIG. 15 is a diagram showing the configuration of a switching power supply device according to a fifteenth embodiment of the present invention.

FIG. 15 is a diagram showing the configuration of a switching power supply circuit according to a fifteenth embodiment of the present invention. In this embodiment, MOS-FET transistors are used as the switching elements Q1, Q2, respectively. The controlling circuits 11, 12 carry out the on-off control of Q1, Q2 by controlling source—gate voltages. In this case, as the diodes D1, D2, the parasitic diodes of the MOS-FET transistors may be used as they are. Moreover, for the capacitors C1, C2, the parasitic capacitances of the MOS-FET transistors may be utilized. In order to increase the electrostatic capacitances of the capacitors C1, C2, another component may be connected in parallel. For the capacitor Cs connected in parallel to the rectifying element Ds in the secondary, the parasitic capacitance of the rectifying element Ds may be used as it is. In order to increase the electrostatic capacitance, another capacitor may be connected in parallel.

Figure 16:
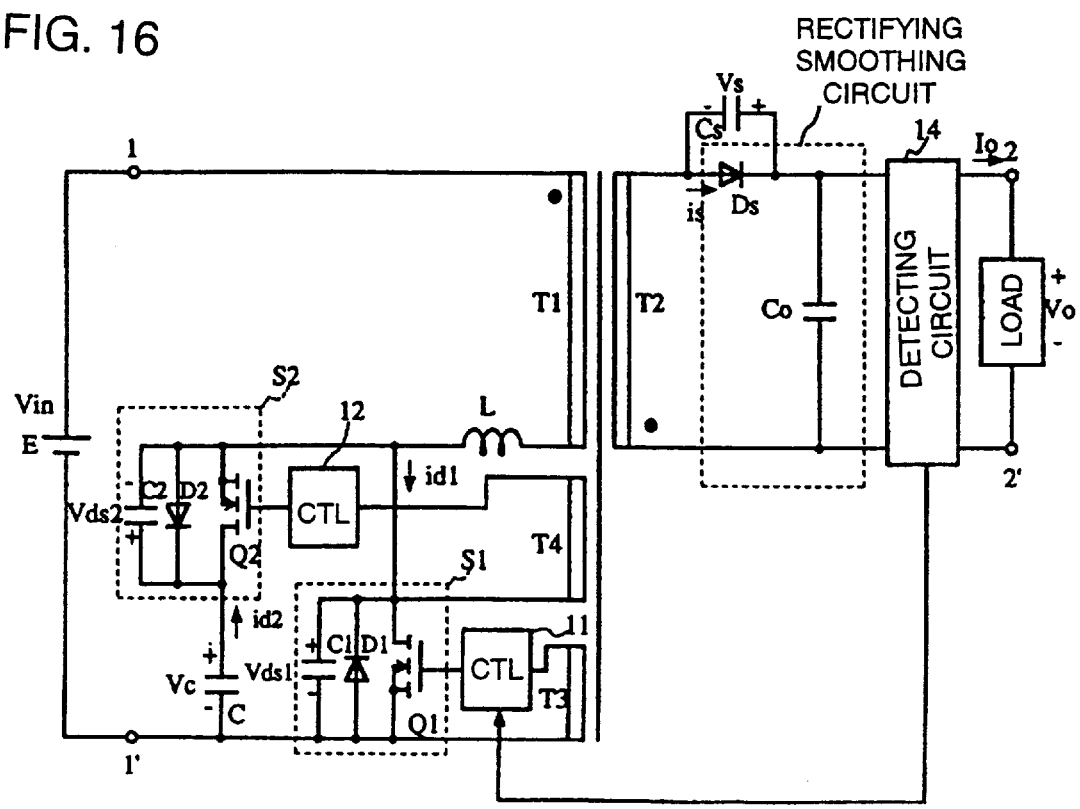
FIG. 16 is a diagram showing the configuration of a switching power supply device according to a sixteenth embodiment of the present invention.

FIG. 16 is a diagram showing the configuration of a switching power supply circuit according to a sixteenth embodiment of the present invention. In this embodiment, the series combination of the second switching circuit S2 and the capacitor C is provided in such a position as be connected in series with the series combination of the inductor designated by T1, the inductor L, and the input power source E. The operation/working-effect of this circuit is similar to that as described with reference to FIG. 15.

Figure 17:
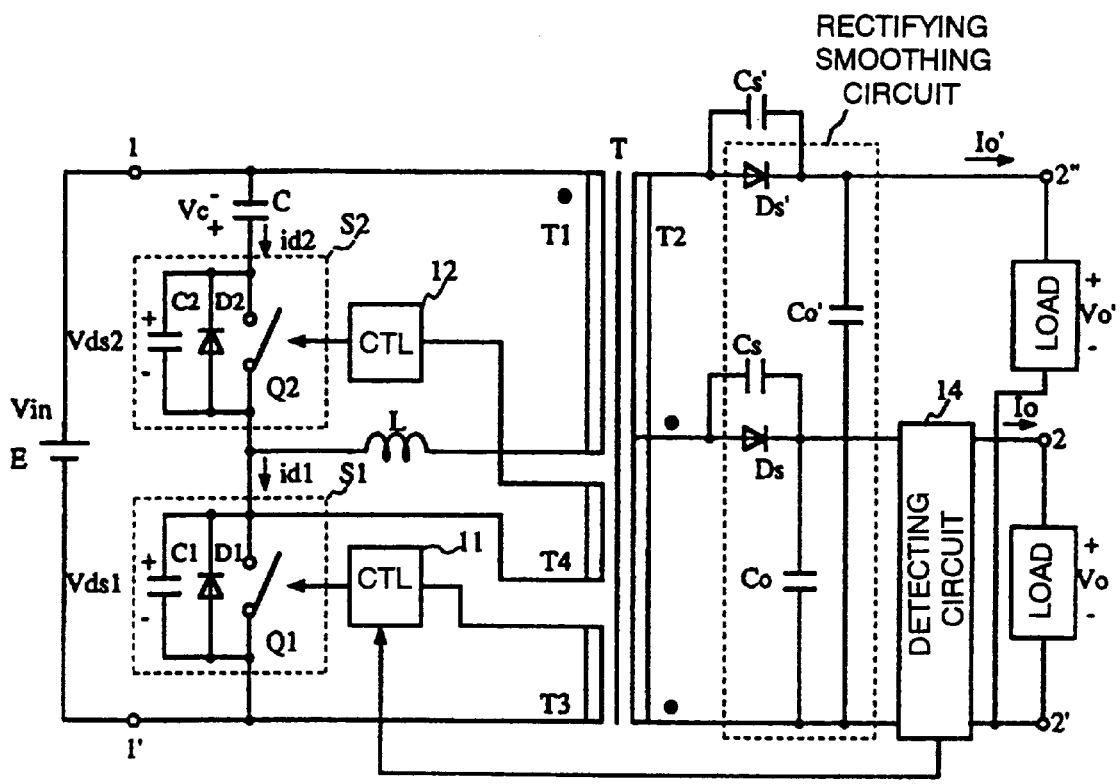
FIG. 17 is a diagram showing the configuration of a seventeenth power supply device according to a seventeenth embodiment of the present invention.

FIG. 17 is a diagram showing the configuration of a switching power supply circuit according to a seventeenth embodiment of the present invention. In this embodiment, the secondary winding T2 of the transformer is provided with two outputs. For the respective outputs, the rectifying diodes Ds, Ds', and the smoothing capacitors Co, Co' are provided, correspondingly. The capacitors Cs, Cs' are connected in parallel to the rectifying diodes Ds, Ds', respectively. The capacitors Cs, Cs' may be used separately or in combination. In this embodiment, the controlling circuit 11, with the output voltage across 2–2' detected, controls the on-time of the switching element Q1. Thus, the output voltage Vo across 2–2' can be obtained as a stable output voltage. In addition, a quasi-stable output voltage is produced across the terminals 2'–2".

Figure 18:
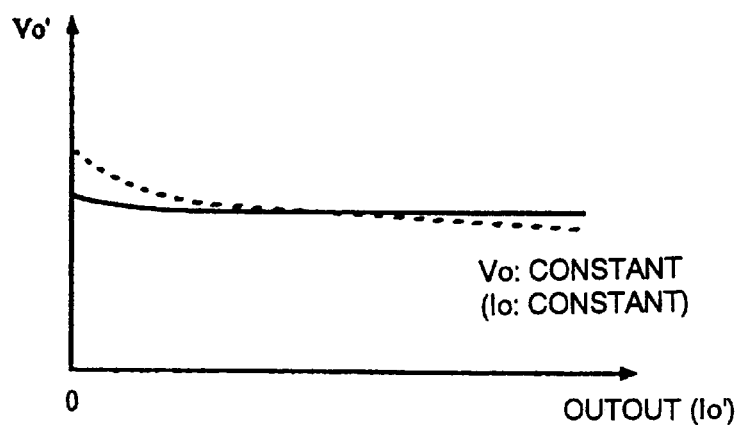
FIG. 18 is a graph showing an example of change in output voltage against output current in the device of FIG. 17.

FIG. 18 is a diagram showing the configuration of a variation characteristic of the output voltage Vo against variations in the load current Io'. In FIG. 18, the broken line represents a characteristic of a conventional, general ringing choke converter, while the solid line shows the characteristics of the power supply circuit shown in FIG. 17. The inductor L and the capacitor C shown in the circuit of FIG. 17 are resonant to make a contribution to the regeneration operation, so that the energy loss can be inhibited. Variations in output voltage Vo' against variations in load current Io" are reduced as compared with a conventional multi-output type ringing choke converter.

Figure 19:
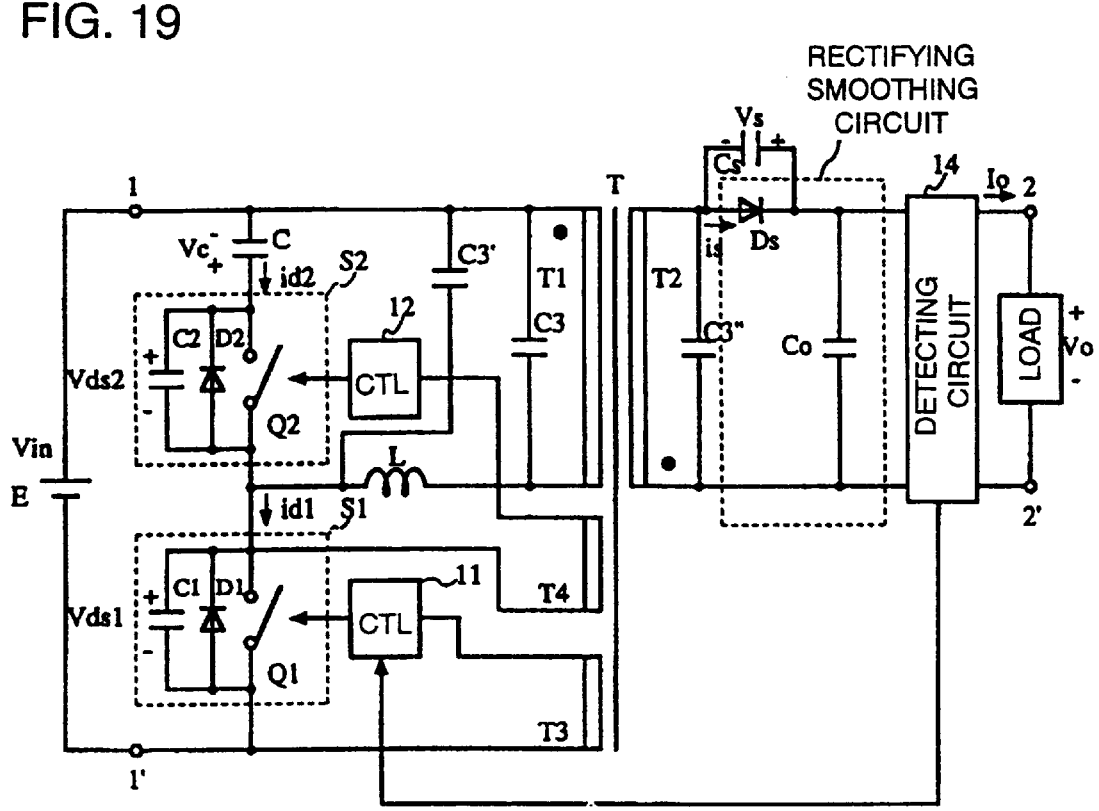
FIG. 19 is a diagram showing the configuration of a power supply device according to an eighteenth embodiment of the present invention.

FIG. 19 is a diagram showing the configuration of a switching power supply circuit according to a eighteenth embodiment of the present invention. The basic configuration is similar to that of the circuit of FIG. 1. However, in this embodiment, a capacitor C3 is connected across the primary winding T1 of the transformer, a capacitor C3" is coupled across the secondary winding T2, and the capacitor C3' is coupled in parallel with the series combination of the primary winding T1 and the inductor L. C3, C3' exert an influence over the resonant condition of the capacitors C1, C2, the inductor L, and the primary winding T1. Accordingly, the resonant frequency can be controlled with the capacitances of the capacitors C3, C3', and C3", while C1, C2, and Cs are not changed. These capacitors C3, C3', and C3" may be used separately or in combination.

As to the circuits described above in reference to the respective embodiments, their operation with respect to the stabilization of output power (output voltage) will be now described.

Figure 25:
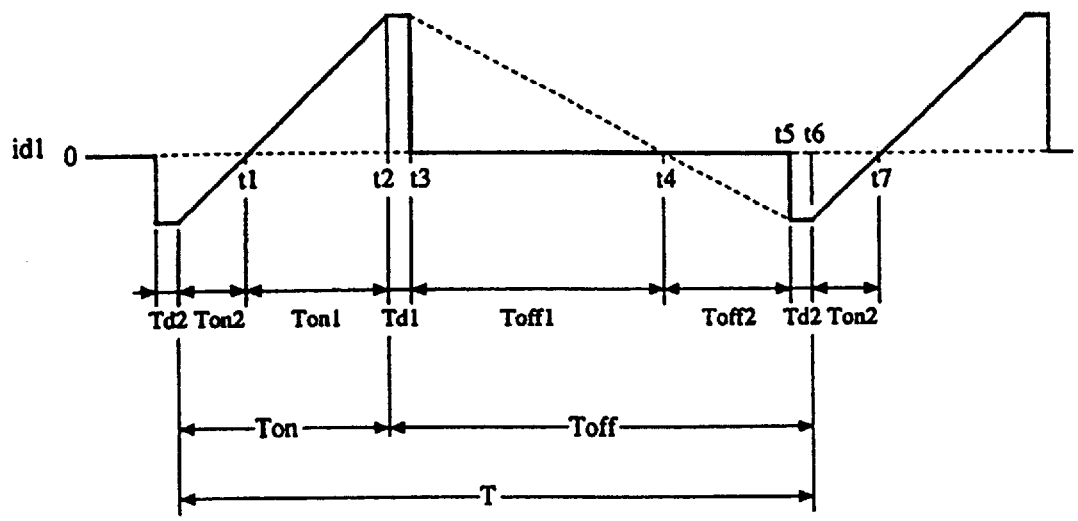
FIG. 25 is a waveform chart, as an example, of a current id1 in one switching period.
Figure 26:
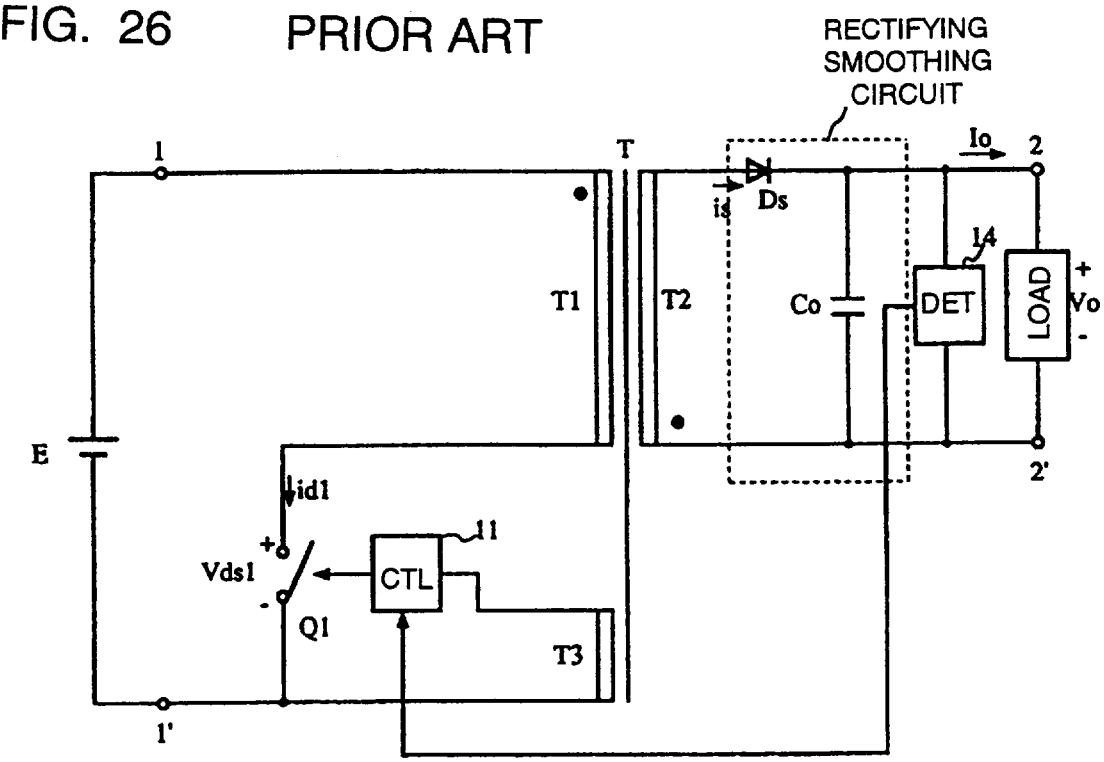
FIG. 26 is a diagram showing an example of the configuration of a conventional ringing choke converter.
Figure 27:
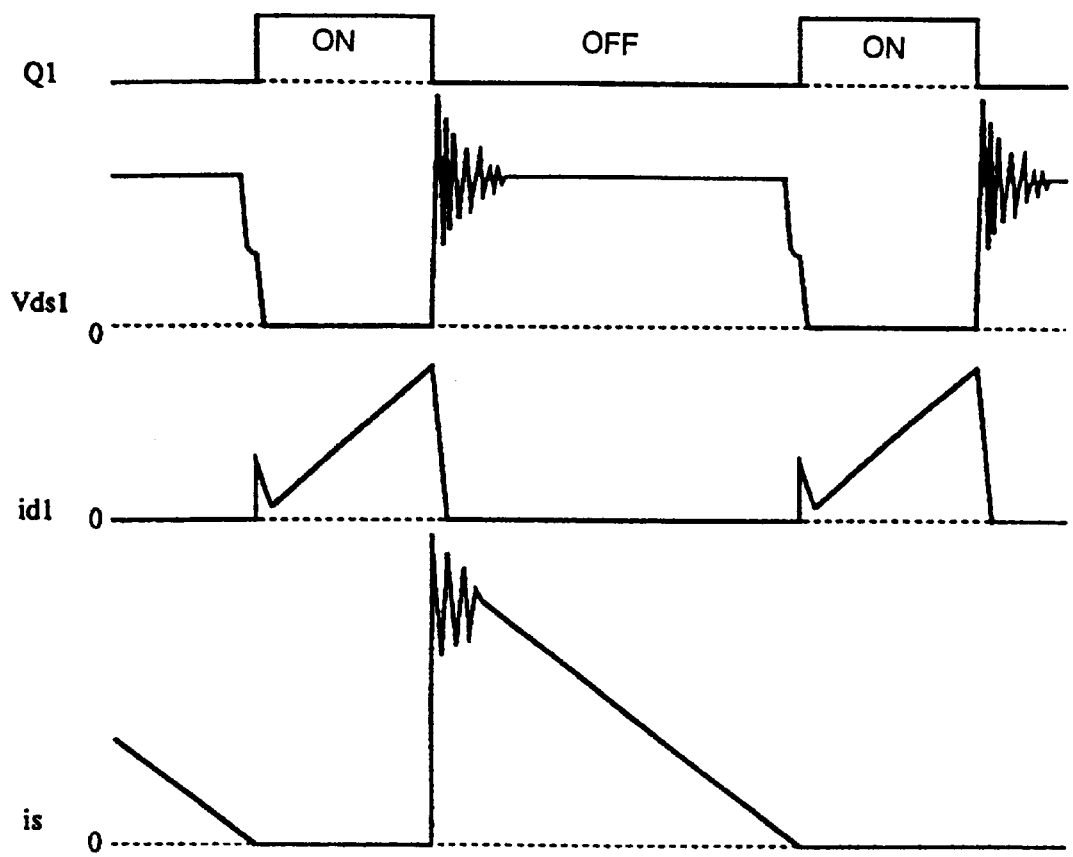
FIG. 27 is a diagram showing waveforms at the respective elements shown in FIG. 26.

First, the waveform of the current id1 in the switching element Q1 operating in one switching period is shown in FIG. 25. In FIG. 25, Ton 1, Td1, Toff 1, Toff2, Td 2, and Ton 2 designate the first excitation period (t1–t2) of the transformer T in the forward direction, the resonant period (t2–t3) when the winding voltage of the transformer is inverted, the period when the stored excitation energy is released, the excitation period (t4–t5) of the transformer T in the reverse direction, the second resonant period (t5–t6) when the winding voltage of the transformer is inverted, and the regeneration period (t5–t7) when the energy of the transformer T excited in the reverse direction is regenerated and returned to the power source, respectively. In the resonant periods Td 1 and Td 2, the energy is not increased or decreased. In this case, the excitation energy P2 of the transformer T in the forward direction is the regeneration energy P3. Accordingly, the following equation is obtained.

$$Po=P1-P2=P1-P3 \quad \text{(equation 1)}$$

in which Po, P1, P2, and P3 designate the output power, the forward excitation energy of the transformer T, the backward excitation energy of the transformer T, and the regeneration energy regenerated from the reverse excitation energy P2 of the transformer T as an input power source, respectively. By using the input voltage V in, the inductance Lm of the primary winding of the transformer T, the switching period T, and the power conversion efficiency η, the energy P1, P2, and Po are expressed as follows.

$$P1=T(V\text{ in}\cdot\text{Ton }1)^2/2Lm \quad \text{(equation 2)}$$

$$P2=T(V\text{ in}\cdot\text{Ton }2)^2/2Lm \quad \text{(equation 3)}$$

$$Po=T\cdot V\text{ in}^2\cdot(\text{Ton }1^2-\text{Ton }2^2)\eta/2Lm \quad \text{(equation 4)}$$

By using the turn number of the primary winding Np of the transformer T, and the turn number Ns of the secondary winding, the output voltage Vo is expressed as follows.

$$Vo=(Ns \cdot Ton\ 1 \cdot V\ in)/(Np \cdot Toff1)= \\ (Ns \cdot Ton\ 2 \cdot V\ in)/(Np \cdot Toff2) \quad \text{(equation 5)}$$

As seen in these equations, in order to control the output voltage against variations in input voltage V in, Ton 1, Toff 1 are controlled by controlling the on-time of the switching element Q1. Moreover, against variations in output voltage (output current), the control of the output voltage is carried out by controlling Ton 1, that is, the on-time of the switching element Q1, or Ton 2, that is, the on-time of the switching element Q2 is controlled, or the on-time of both of Ton 1 and Ton 2. In this case, according to the equation 5. Ton 1/Toff 1 and Ton 2/Toff2 can be determined by the output voltage Vo, the input voltage Vin, and the turns ratio Ns/Np of the transformer.

The switching frequency is expressed as:

$$f=1/(Ton+Toff)=1/(Ton\ 1+Ton\ 2+Toff\ 1+Toff2+Td\ 1+Td\ 2).$$

From this equation and the equation 5, the following can be derived.

$$f=1/[\{1+(Ns \times V\ in)/(Np \times Vo)\}(Ton\ 1+Ton\ 2)+ \\ Td\ 1+Td\ 2] \quad \text{(equation 6)}$$

Figure 22A:
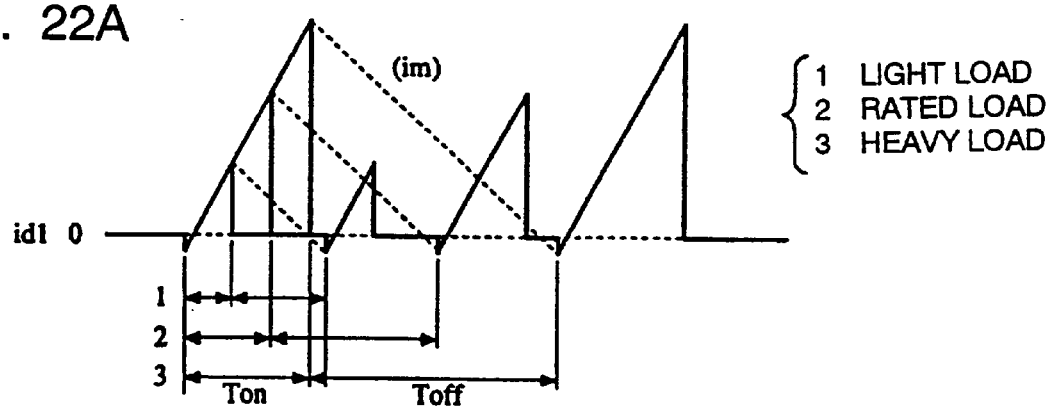
FIGS. 22A to 22C are waveform charts showing an example of change in output current id1 against quantity of load.

In the case that the on-time of the switching element Q2 is controlled so that the excitation time Toff2 of the transformer T in the reverse direction becomes a minimum time (constant time) required for the zero voltage switching operation, Toff2 and Ton 2 are substantially constant, which is determined by the input voltage V in. Capacitors C1, C2, and the inductance Lm of the primary winding T1 of the transformer. Ton 1 is controlled in dependence on the quantity of a load. FIG. 22A illustrates changes in current id1 occurring in this case, schematically. In FIG. 22, the periods Td1, Td2 are omitted, and the exciting currents are represented by the broken lines, in which the reverse direction with respect to FIG. 24 is a positive direction. Thus, the controlling circuit 11 controls the on-time of the switching element Q1 in such a manner that the on-time Ton 1 of the switching element Q1 becomes longer as the load is heavier while the excitation time Toff2 of the transformer T in the reverse direction is kept minimum (constant time). In this case, the controlling circuit 11 controls the switching element Q2 synchronously with the switching element Q1 so that the excitation time Toff2 of the transformer T in the reverse direction becomes minimum as described above. Then, the switching frequency is determined according to the equation 6, and Ton 2, Td 1, and Td 2 have substantially constant values which are determined by the respective resonance frequencies. Accordingly, it is understood that the switching frequency is increased substantially inversely proportional to Ton 1 as the load is decreased. The change range of the switching frequency will be now compared with that of a conventional RCC. The switching frequency f2 of the conventional RCC is expressed by the following equation, in correspondence to the equation 6.

$$f2=1/\{1+(Ns \cdot V\ in)/(Np \cdot Vo)\}Ton\ 1. \quad \text{(equation 7)}$$

As seen apparently in a comparison of equation 6 with equation 7, the increase of the switching frequency when the load is light is inhibited by the switching control system as illustrated in FIG. 22A in contrast to a conventional system, since time Ton 2, Td 1, and Td 2 are provided. See FIG. 25.

The time Td 1, Td 2 are provided by the connection of the capacitor Cs in parallel to the rectifying element. Td 1 is a period of time while the capacitor Cs is discharged until the zero voltage by release of the energy in the secondary. Td 2 is a period of time while the capacitor Cs is charged until it reaches the sum of the output voltage and the secondary winding voltage. In these periods, only the transition of energy occurs. By these periods of time provided, an increase in switching frequency when the load is light is inhibited.

Figure 23:
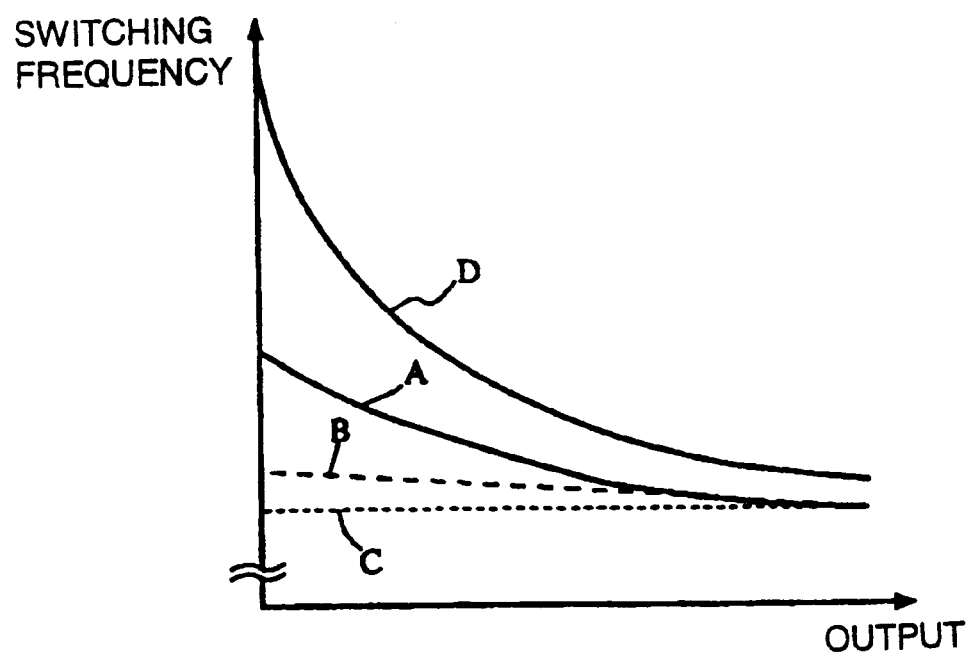
FIG. 23 is a graph showing an example of change in switching frequency against output current.

FIG. 23 is a graph showing a relationship between the output voltage (current) caused by the operation of the above controlling circuit 11. In FIG. 23, A represents a characteristic obtained by the system as described in reference to FIG. 22A, and B shows a characteristic of a conventional RCC. As seen in FIG. 23, as to the conventional RCC system, the output is substantially inversely proportional to the switching frequency. According to the control system as described in reference to FIG. 22A, the variation of the switching frequency is inhibited on a low level, as compared with the conventional RCC.

According to the switching control system as illustrated in FIG. 22A, the diode 1 scarcely conducts, though the switching frequency is varied. Accordingly, the conduction loss and the reverse recovery loss of the diode D1 are negligible. In the case of a light load, the peak current when the switching element Q1 is turned off is small. Accordingly, the conduction losses in the switching elements Q1, Q2, the conduction loss in the transformer T, and the change range of the magnetic flux are small. For this reason, the circuit can operate at high efficiency in the range from a light to a heavy load.

Figure 22B:
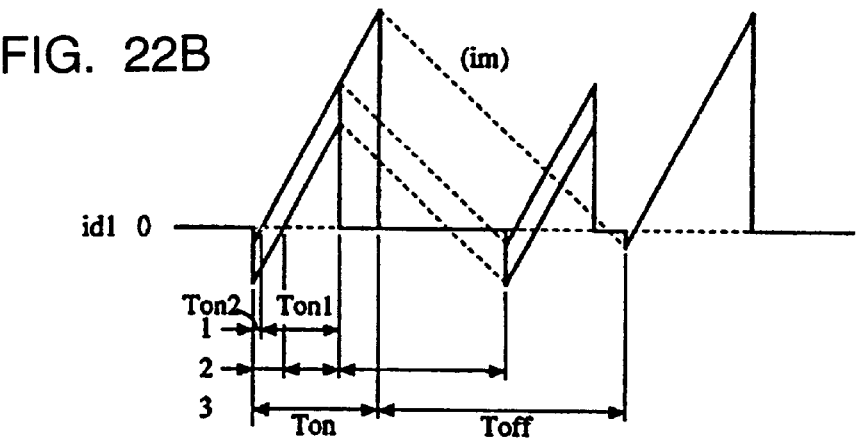
Figure 22C:
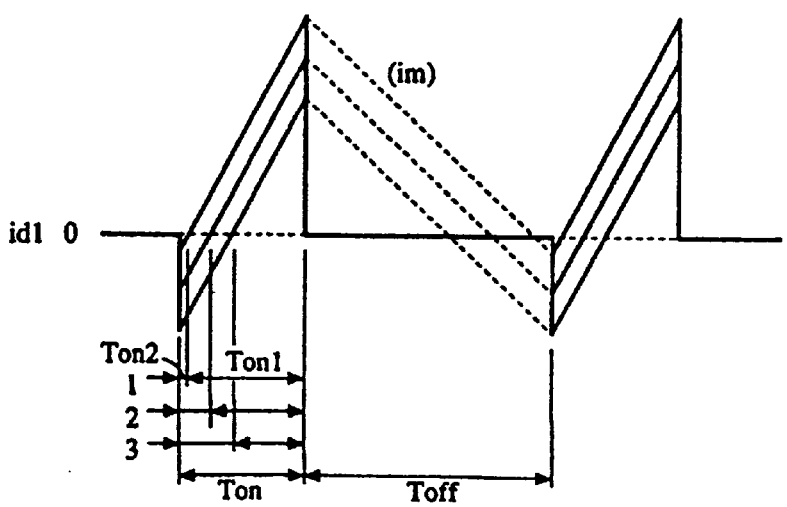

Moreover, in the respective embodiments as described above, the output power(current) can be controlled with the switching frequency kept substantially constant. More particularly, the switching frequency is made nearly constant by making (Ton 1+Ton 2) substantially constant according to equation 6, and by changing the ratio of Ton 1 to Ton 2, the output voltage can be controlled. FIG. 22C illustrates an example of the change on the current id1 occurring in the above case, schematically. As seen in FIG. 22C, as the load is heavier, the ratio of Ton 1 to Ton 2 is increased. In other words, the controlling circuit 11 controls the on-time Ton 1 of the switching element Q1 depending on the quantity of the load to make the output voltage constant. The controlling circuit 12 controls so as to make Ton+Toff constant, by making the switching element Q2 be on-off synchronously with the switching element Q1, and making the on-time Toff of the switching element Q2 constant, irrespective of the quantity of the load.

FIG. 22 (C) represents a characteristic of the system. According to the control system illustrated in FIG. 22C, the switching frequency is constant, irrespective of the quantity of a load.

However, by this switching control system, even in the case that the load is light, the peak current and so forth, the switching loss and the conduction loss in the switching elements Q1, Q2 are large, the change range of the magnetic flux of the transformer T is maximum at any moment, when the switching element Q1 is turned off.

Therefore, the control system by which Toff is so controlled depending on the quantity of a load as to make Toff2 constant, and the control system by which Toff is controlled to be constant irrespective of the quantity of the load are combined. When the load is light, the output voltage is controlled by changing the ratio of Ton1 to Ton 2. Further, the increase of the switching frequency is inhibited. In the load range where the variation of the switching frequency is insignificant, the output voltage is controlled by lengthening the on-time Ton 1 of the switching element Q1 with an increase in the load while Toff2 is kept minimum. FIG. 22B illustrates schematically changes in the current id1 in the above case. FIG. 22 B illustrates schematically a relationship of the variation in switching frequency against the quantity of a load in the above case. The control system illustrated in FIG. 22B has an intermediate characteristic between those of the systems A, C illustrated in FIG. 22. Accordingly, the operation is well-balanced, and can be carried out with high efficiency in the range from a light to a heavy load while the variation of the switching frequency is inhibited.

According to the control system illustrated in FIG. 22A, in the case that Toff2 is made minimum and constant, irrespective of the quantity of a load, the on-time T off of Q2 is controlled in dependence on the output current. For this purpose, the quantity of the load is detected. For example, the detecting circuit 14 as shown in FIG. 1 detects the output current Io in addition to the output voltage Vo. The controlling circuit 12, receiving its detection signal, controls the off-timing of Q2 to make Toff2 minimum. In addition, as seen in FIG. 22C, by the control system in which Toff is made constant, the controlling circuit 12 may be provided with a time constant circuit and so configured that the time from the turn-on of Q2 to the turn-off is constant at any time.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply device having a series combination of a first switching circuit and an input power source connected in series with a series combination of a first winding of a transformer and an inductor, a series combination of a second switching circuit and a switched capacitor connected in parallel to a series combination of said first winding of the transformer and said inductor and further wherein a second winding of said transformer is provided with a rectifying smoothing circuit including a rectifying element, wherein said first switching circuit comprises a parallel connection circuit including a first switching element, a first diode, and a first capacitor, said second switching circuit comprises a parallel connection circuit including a second switching element, a second diode, and a second capacitor, and further comprising a switching controlling circuit adapted to turn said first and second switching elements on and off alternately with a period of time when both switching elements are off being interposed, and a capacitor being connected in parallel to said rectifying element in said rectifying smoothing circuit.

2. The switching power supply of claim 1, wherein the switching controlling circuit comprises repsective first and second switching controlling circuits controlling respective ones of said first and second switching circuits.

3. A switching power supply device having a series combination of a first switching circuit and an input power source connected in series with a series combination of a first winding of a transformer and an inductor, and a series combination of a second switching circuit and a switched capacitor connected in series with a series combination of said first winding of said transformer, said inductor, and said input power source, and further wherein a second winding of said transformer is provided with a rectifying smoothing circuit including a rectifying element, wherein said first switching circuit comprises a parallel connection circuit including a first switching element, a first diode, and a first capacitor, said second switching circuit comprises a parallel connection circuit including a second switching element, a second diode, and a second capacitor, and further comprising a switching controlling circuit adapted to turn said first and second switching elements on and off alternately with a period of time when both switching elements are off being interposed, and a capacitor being connected in parallel to said rectifying element in said rectifying smoothing circuit.

4. The switching power supply of claim 3, wherein the switching controlling circuit comprises repsective first and second switching controlling circuits controlling respective ones of said first and second switching circuits.

5. The switching power supply device of claim 1, wherein said transformer is provided with two bias windings, said switching controlling circuit being adapted to control the first switching element and the second switching element to self-oscillate, respectively, by inputting voltages substantially proportional to first winding voltages produced in said two bias windings, respectively.

6. The switching power supply device of claim 3, wherein said transformer is provided with two bias windings, said switching controlling circuit being adapted to control the first switching element and the second switching element to self-oscillate, respectively, by inputting voltages substantially proportional to first winding voltages produced in said two bias windings, respectively.

7. The switching power supply device of claim 1, wherein said switching controlling circuit is adapted to control the first switching element and the second switching element respectively, by inputting voltages substantially proportional to a first winding voltage produced in a bias winding of the transformer to turn the first switching element and the second switching element on and off alternately, to self-oscillate in dependence on whether said voltage produced in the bias winding is positive or negative.

8. The switching power supply device of claim 3, wherein said switching controlling circuit is adapted to control the first switching element and the second switching element respectively, by inputting voltages substantially proportional to a first winding voltage produced in a bias winding of the transformer to turn the first switching element and the second switching element on and off alternately, to self-oscillate in dependence on whether said voltage produced in the bias winding is positive or negative.

9. The switching power supply device of claim 1, wherein said rectifying element comprises a switching element adapted to be switched by a control signal.

10. The switching power supply device of claim 3, wherein said rectifying element comprises a switching element adapted to be switched by a control signal.

11. The switching power supply device of claim 1, wherein said first winding of said transformer is split into at least two portions, whereby the transformer first winding has two outputs and a common terminal, each output of said split primary winding and the common terminal being connected to a respective one of the first and second switching circuits.

12. The switching power supply device of claim 3, wherein said first winding of said transformer is split into at least two portions, whereby the transformer first winding has two outputs and a common terminal, each output of said split primary winding and the common terminal being connected to a respective one of the first and second switching circuits.

13. The switching power supply device of claim 1, wherein a further first winding, different from said first winding with which said power source is connected in series, is provided, and said second switching circuit is connected in parallel to a series combination of said further first winding and the inductor.

14. The switching power supply device of claim 3, wherein a further first winding, different from said first winding with which said power source is connected in series, is provided, and said second switching circuit is connected in parallel to a series combination of said further first winding and the inductor.

15. The switching power supply device of claim 1, wherein said transformer comprises an inductance element which also acts wholly or partially as the first winding and the second winding of the transformer.

16. The switching power supply device of claim 3, wherein said transformer comprises an inductance element which also acts wholly or partially as the first winding and the second winding of the transformer.

17. The switching power supply device of claim 1, wherein each of said switching elements comprises a field-effect transistor.

18. The switching power supply device of claim 3, wherein each of said switching elements comprises a field-effect transistor.

19. The switching power supply device of claim 1, wherein said inductor comprises a leakage inductance of said transformer.

20. The switching power supply device of claim 1, wherein said inductor comprises a leakage inductance of said transformer.

21. The switching power supply device of claim 1, wherein as said rectifying element comprises a diode, and the parasitic capacitance of said diode is used as the capacitor connected in parallel to said rectifying element.

22. The switching power supply device of claim 3, wherein said rectifying element comprises a diode, and the parasitic capacitance of said diode is used as the capacitor connected in parallel to said rectifying element.

23. The switching power supply device of claim 1, wherein at least two outputs are provided for the second winding of the transformer, and each of said two outputs is provided with a rectifying smoothing circuit.

24. The switching power supply device of claim 3, wherein at least two outputs are provided for the second winding of the transformer, and each of said two outputs is provided with a rectifying smoothing circuit.

25. The switching power supply device of claim 1, wherein a capacitor is connected across the second winding of the transformer or in parallel to the series combination of said primary winding and said inductor.

26. The switching power supply device of claim 3, wherein a capacitor is connected across the second winding of the transformer or in parallel to the series combination of said primary winding and said inductor.

27. The switching power supply device of claim 1, wherein said switching controlling circuit is adapted to turn the first switching element on after a voltage across the first capacitor is decreased to or near to zero voltage.

28. The switching power supply device of claim 3, wherein said switching controlling circuit is adapted to turn the first switching element on after a voltage across the first capacitor is decreased to or near to zero voltage.

29. The switching power supply device of claim 1, wherein said switching controlling circuit is adapted to turn the second switching element on after the voltage across the second capacitor is decreased to or near to zero voltage.

30. The switching power supply device of claim 3, wherein said switching controlling circuit is adapted to turn the second switching element on after the voltage across the second capacitor is decreased to or near to zero voltage.

31. The switching power supply device of claim 1, wherein said switching controlling circuit causes a current flowing in the second switching element to be turned off at zero or near to zero.

32. The switching power supply device of claim 3, wherein said switching controlling circuit causes a current flowing in the second switching element to be turned off at zero or near to zero.

33. The switching power supply device of claim 1, wherein values of said switched capacitor and said inductor, and an on-period of the second switching element to be produced by said switching controlling circuit are so set that a waveform of a current flowing in the rectifying element rises nearly at zero current, reaches a peak point at which a ratio of current change is zero, and then represents the zero current at which the current is turned off.

34. The switching power supply device of claim 3, wherein values of said switched capacitor and said inductor, and an on-period of the second switching element to be produced by said switching controlling circuit are so set that a waveform of a current flowing in the rectifying element rises nearly at zero current, reaches a peak point at which a ratio of current change is zero, and then represents the zero current at which the current is turned off.

35. The switching power supply device of claim 1, where a value of the capacitor connected in parallel to the rectifying element is so set that the capacitor is resonant with the second winding of the transformer when the first switching element or the second switching element is off, so that a voltage waveform across said capacitor forms a part of a sinusoidal waveform, and rises at a zero voltage or falls toward the zero voltage.

36. The switching power supply device of claim 3, where a value of the capacitor connected in parallel to the rectifying element is so set that the capacitor is resonant with the second winding of the transformer when the first switching element or the second switching element is off, so that a vantage waveform across said capacitor forms a part of a sinusoidal waveform, and rises at a zero voltage or falls toward the zero voltage.

37. The switching power supply device of claim 1, wherein said switching controlling circuit is adapted to voltage-control an output from said rectifying smoothing circuit by changing an on-time of the first switching element and changing an on-time of the second switching element in dependence on a quantity of a load connected to an output of said rectifying smoothing circuit so that an excitation quantity of the transformer in a reverse direction becomes zero or predeterminately constant.

38. The switching power supply device of claim 3, wherein said switching controlling circuit is adapted to voltage-control an output from said rectifying smoothing circuit by changing an on-time of the first switching element and changing an on-time of the second switching element in dependence on a quantity of a load connected to an output of said rectifying smoothing circuit so that an excitation quantity of the transformer in a reverse direction becomes zero or predeterminately constant.

39. The switching power supply device of claim 1, wherein said switching controlling circuit is adapted to voltage-control an output from said rectifying smoothing circuit by changing an on-time of the first switching element and a ratio of the excitation quantity of the transformer in a reverse direction to an excitation quantity in a forward direction in dependence on a quantity of a load connected to an output of said rectifying smoothing circuit.

40. The switching power supply device of claim 3, wherein said switching controlling circuit is adapted to voltage-control an output from said rectifying smoothing circuit by changing an on-time of the first switching element and a ratio of the excitation quantity of the transformer in a reverse direction to an excitation quantity in a forward direction in dependence on a quantity of a load connected to an output of said rectifying smoothing circuit.

41. The switching power supply device of claim 1, wherein said switching controlling circuit is adapted to voltage-control an output from said rectifying smoothing circuit and make an on-time of the second switching circuit substantially constant by changing a ratio of an excitation quantity of the transformer in a reverse direction to an excitation quantity in a forward direction in dependence on a quantity of a load connected to an output of said rectifying smoothing circuit.

42. The switching power supply device of claim 3, wherein said switching controlling circuit is adapted to voltage-control an output from said rectifying smoothing circuit and make an on-time of the second switching circuit substantially constant by changing a ratio of an excitation quantity of the transformer in a reverse direction to an excitation quantity in a forward direction in dependence on a quantity of a load connected to an output of said rectifying smoothing circuit.

* * * * *